US008487919B2

(12) United States Patent
Kobayashi

(10) Patent No.: US 8,487,919 B2
(45) Date of Patent: Jul. 16, 2013

(54) IMAGE PROCESSING APPARATUS AND IMAGE PROCESSING METHOD

(75) Inventor: Kiwamu Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1289 days.

(21) Appl. No.: 12/185,371

(22) Filed: Aug. 4, 2008

(65) Prior Publication Data

US 2009/0073192 A1    Mar. 19, 2009

(30) Foreign Application Priority Data

Aug. 8, 2007    (JP) ................................. 2007-207182

(51) Int. Cl.
*G06F 3/038*    (2006.01)
(52) U.S. Cl.
USPC ........................................................ 345/204
(58) Field of Classification Search
USPC .................... 345/204–205, 87–102, 76–83
See application file for complete search history.

(56) References Cited

U.S. PATENT DOCUMENTS

| 4,676,062 | A | 6/1987 | Brockmanns et al. |
| 6,056,408 | A | 5/2000 | Kobayashi ..................... 353/122 |
| 7,202,843 | B2 | 4/2007 | Shen et al. ...................... 345/87 |
| 7,400,321 | B2 * | 7/2008 | Aiba et al. ..................... 345/204 |
| 7,724,266 | B2 * | 5/2010 | Aizawa et al. ................. 345/619 |
| 2005/0078069 | A1 | 4/2005 | Aiba et al. ....................... 345/87 |
| 2006/0227249 | A1 | 10/2006 | Chen et al. |
| 2008/0158431 | A1 * | 7/2008 | Russell .......................... 348/712 |
| 2008/0252583 | A1 * | 10/2008 | Sakashita et al. ............... 345/90 |
| 2010/0149227 | A1 * | 6/2010 | Tomizawa et al. ............ 345/694 |

FOREIGN PATENT DOCUMENTS

| EP | 1 777 939 | | 4/2007 |
| JP | 60-215823 A | | 10/1985 |
| JP | 6-070288 A | | 3/1994 |
| JP | 2002-351382 A | | 12/2002 |
| WO | WO2006093163 | * | 8/2006 |

OTHER PUBLICATIONS

European Search Report dated Oct. 6, 2009, in related corresponding European Patent Appln. No. 08162110.4.

* cited by examiner

*Primary Examiner* — Quan-Zhen Wang
*Assistant Examiner* — Chad Dicke
(74) *Attorney, Agent, or Firm* — Fitzpatrick, Cella, Harper & Scinto

(57) ABSTRACT

In an image display apparatus which displays a picture by inverting the drive polarity for each sub-frame, when the pictures of adjacent sub-frames are different from each other, image data is generated to prevent accumulation of electrical charges in each display element. For this purpose, the first and second sub-frames are generated from a frame of interest of a moving picture. The difference between the pictures of the first and the second sub-frames is detected. A correction value is calculated by subtracting from the difference a cumulative value multiplied by a predetermined coefficient. A value obtained by subtracting the correction value from the difference is accumulated as the cumulative value. The pictures of the first and second sub-frames are corrected by the correction value.

11 Claims, 17 Drawing Sheets

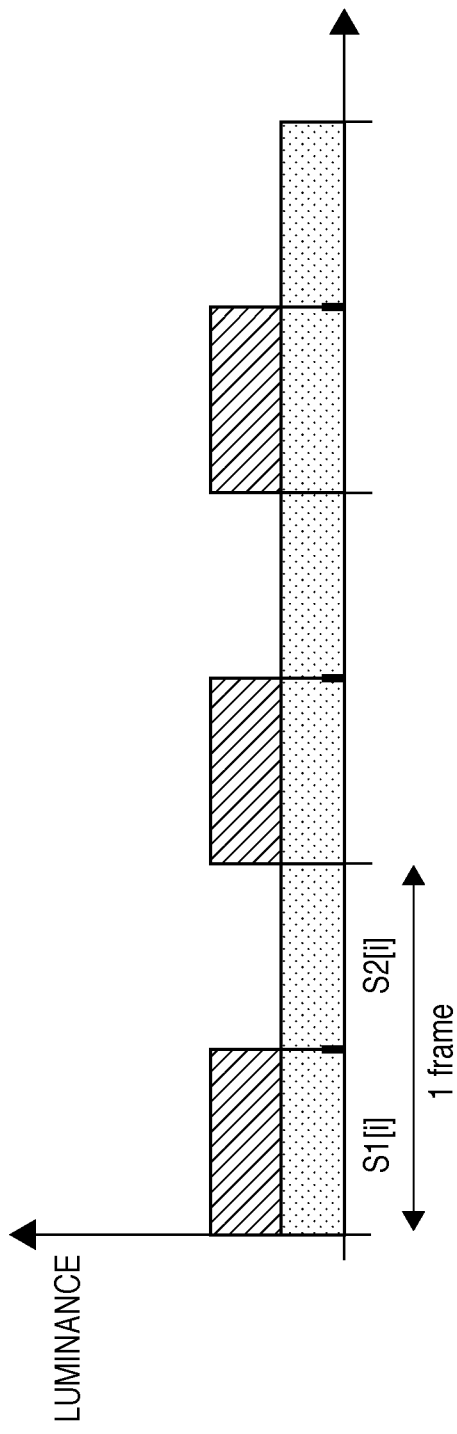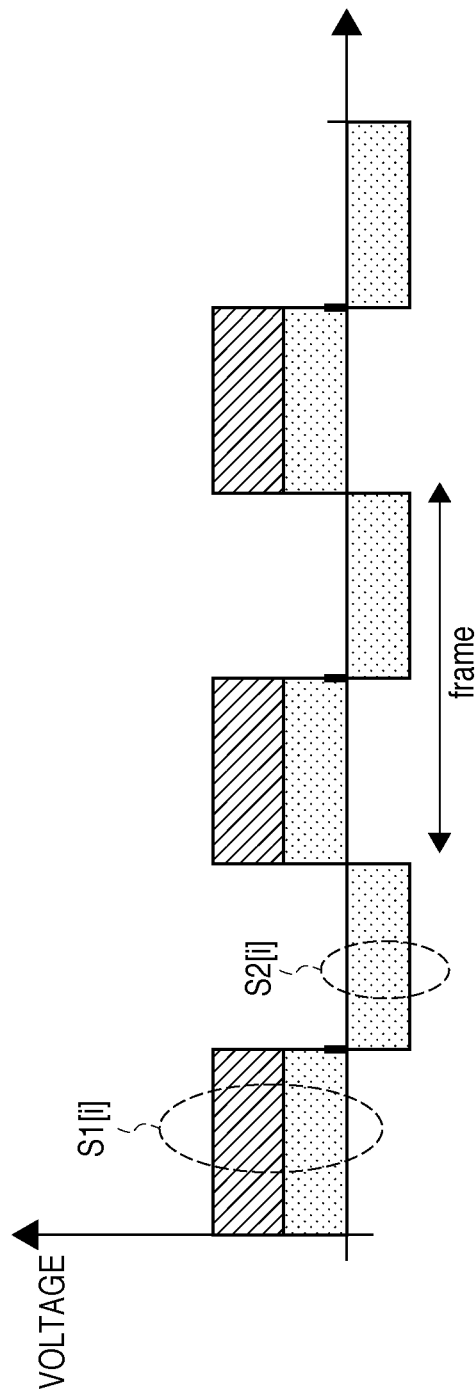

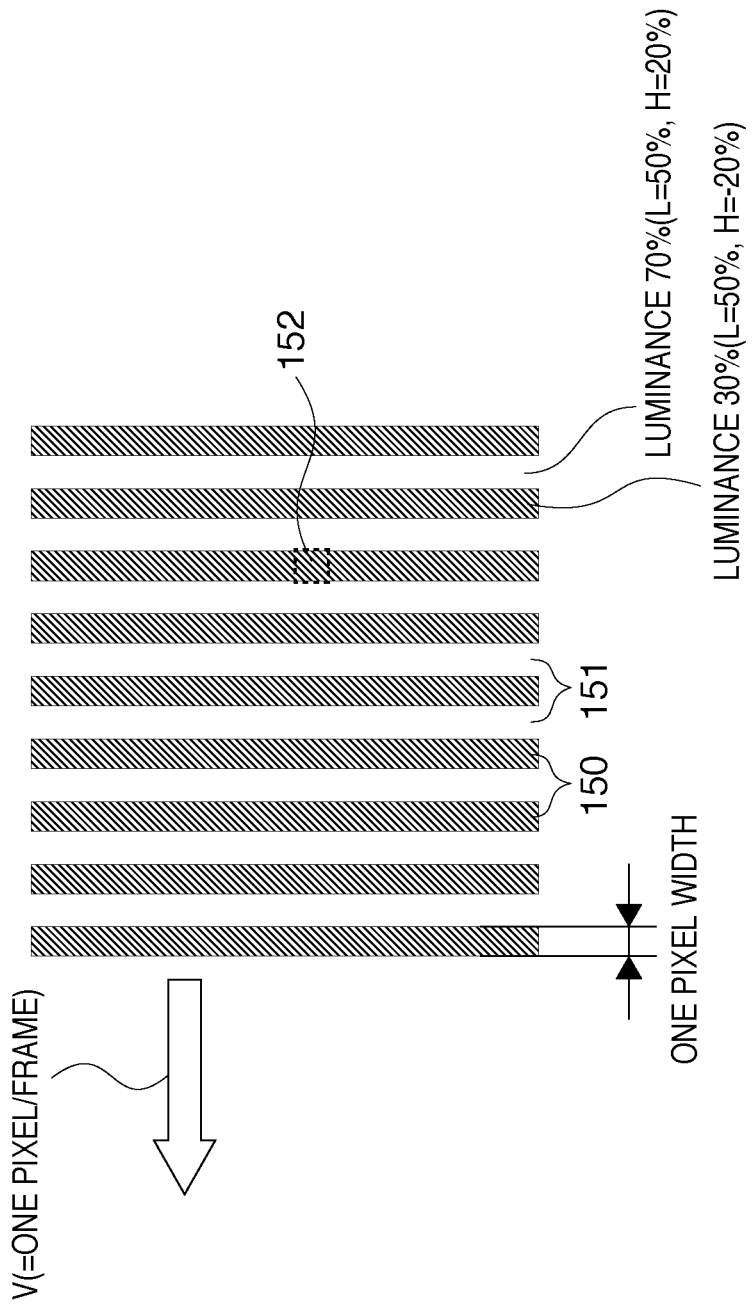

IMAGE PROCESSING APPARATUS AND IMAGE PROCESSING METHOD

BACKGROUND OF THE INVENTION

1. Field of the Invention

The present invention relates to an image processing apparatus and image processing method for generating image data to be supplied to an image display apparatus which inverts the drive polarity of display elements in each of plural sub-frames formed from a frame of a moving picture to display the moving picture.

2. Description of the Related Art

A cathode ray tube (CRT) has been synonymous with a moving picture display device for a television and the like. However, liquid crystal displays (LCDs), plasma displays (PDPs), and field emission displays (FEDs) have been put into practical use in recent years. There are displays of various display types now. The displays of these types adopt different display methods. For example, display devices based on a liquid crystal display (e.g., a direct viewing type LCD, liquid crystal rear projector, and liquid crystal front projector) use many scanning methods. In any case, the period of outputting light in each pixel portion occupies a large part of one frame. For this reason, such a display is called a hold-type display.

On the other hand, in a CRT or FED, light is output in each pixel portion once in a frame. The period of emitting light is much shorter than the frame length and is normally 2 msec or less. For this reason, such a display is called an impulse-type display.

There also exist a PDP and field sequential display (FSD) which are of types different from the above-mentioned classes.

The hold-type display and impulse-type display have the following features.

The hold-type display: A display of this type emits light during a large part of the frame period. Hence, temporal variations of light intensity are small, and flicker is rarely observed. However, pursuit (pursuing a moving portion in a moving picture by eyes) makes the motion blur relatively large in accordance with the length of the period of emitting light in a frame. This motion blur here is different from that caused by the response characteristic of a display device.

The impulse-type display: A display of this type has a very short period of emitting light in a frame. Hence, temporal variations of light intensity are large, and flicker synchronous with a frame is observed. However, the motion blur in pursuit is rarely observed. It is, therefore, possible to obtain a resolution almost equal to that of a still object.

In general, the period of emitting light in a display changes depending on the display method and display device. The hold-type display and impulse-type display are poles apart in terms of in the period of emitting light. The period of emitting light and the degree of motion blur are almost proportional to each other. Longer periods of light emission result in larger amounts of motion blur. Shorter periods of light emission result in smaller amounts of motion blur. On the other hand, concerning flicker synchronous with a frame, longer periods of light emission result in smaller flicker. Shorter periods of light emission result in larger flicker. In this manner, the motion blur and flicker have trade-off relationships with respect to the period of emitting light.

A solution to the motion blur and flicker is multiplying the frame frequency by N. In many cases, N=2. That is, the frame frequency is doubled. When the frame frequency is doubled, the period of emitting light in each double speed-frame is halved. This also almost halves the motion blur. Regarding flicker as well, if an initial frame frequency of 60 Hz is doubled to 120 Hz, the frame frequency falls outside the response characteristic of human eyes. Hence, no flicker is observed.

As described above, multiplying the frame frequency by N has a large effect but poses a new problem.

For example, when the frame frequency of an original picture signal is 60 Hz, the picture information is updated every $\frac{1}{60}$ sec. If the frame frequency is doubled to display a picture at 120 Hz, necessary picture information is missing every other frame. As a measure, identical pictures are displayed, for example, twice if the frame frequency is doubled. This solves flicker but cannot improve the motion blur in the original picture. In an impulse-type display, double pictures are observed by pursuit.

To double the frame frequency, two methods are mainly used.

The first method detects the motion of an object in an original picture and predicts pictures between two frames. This is generally called an "intermediate picture insertion method based on motion compensation". In the first method, the amount of calculation is enormous, and a prediction error occurs under a specific condition.

In the second method, first, filtering is performed for each frame of an input picture to separate the spatial frequency into a high frequency component which greatly concerns the motion blur and a low frequency component which greatly concerns flicker. Then, the high frequency component is concentrated to one sub-frame (one of two double speed-frames corresponding to the original frame). The low frequency component is distributed to both sub-frames (both of the two double speed-frames corresponding to the original frame). The second method will be called a "sub-frame display method based on spatial frequency separation".

In a display using a liquid crystal panel, if the liquid crystal panel is driven while the DC balance is disturbed, electrical charges are accumulated between electrodes to degrade the image quality. To avoid this, the drive polarity of the liquid crystal panel is inverted every predetermined cycle to cancel the DC offset of the voltage applied between electrodes. The inversion cycle is one frame or a sub-frame obtained by uniformly dividing one frame.

When AC drive is performed to invert the polarity for each frame or sub-frame (to be referred to as frame inversion hereinafter), a pair of polarity-inverted displays need to be the same picture considering the purpose of avoiding the DC offset every pixel. However, even if signals are identical, the display sensitivity or non-linear characteristic to the drive voltage is not always the same or symmetrical between a case where the device is driven by a positive voltage and a case where it is driven by a negative voltage. The luminance slightly changes between these two cases, causing flicker.

To cancel the flicker, a direct viewing type LCD executes the above-described frame inversion, and at the same time, executes spatial polarity inversion, that is, pixel inversion to invert the polarity for each display element (pixel) (e.g., in a staggered pattern). Alternatively, the direct viewing type LCD executes line inversion to invert the polarity for each vertical or horizontal line.

This pixel inversion or line inversion causes the following problems in a method of performing projection display using a microdisplay, like a rear projector or front projector. That is, the electric field leaks between inverted areas (so-called disclination), adversely affecting the display picture. To prevent this, the microdisplay performs only temporal polarity inversion, that is, frame inversion without performing spatial polarity inversion, that is, pixel inversion or line inversion. Hence, the microdisplay suffers flicker.

To make flicker unobserved by the user, the microdisplay doubles the flicker frequency by doubling the refresh rate of the display. For example, when the frame frequency of an original picture to be displayed is 60 Hz, the refresh rate of the display device is set to 120 Hz to set the flicker frequency to 120 Hz. The 120-Hz flicker greatly exceeds the limit of the frequency recognizable by human eyes, so the problem of flicker is solved.

If the speed of the display device is doubled and 120-Hz frame inversion (to be referred to as double speed-frame inversion hereinafter) is done in order to practice the "sub-frame display method based on spatial frequency separation", the following problem arises. That is, in double speed-frame inversion, a picture when driving the liquid crystal panel by a positive voltage and that when driving the panel by a negative voltage are different from each other. Thus, the DC balance in driving distorts in each pixel. In a liquid crystal microdisplay or the like, electrical charges are accumulated in each display element, and the residue image of a preceding picture appears.

To solve this problem, the polarity may also be inverted in a longer cycle separately from double speed-frame inversion. If the polarity is inverted in a long cycle, changes of the luminance and color stand out, degrading the image quality.

SUMMARY OF THE INVENTION

According to one aspect, an image processing method of generating image data to be supplied to an image display apparatus which inverts a drive polarity of display elements in each sub-frame of plural sub-frames formed from a frame of a moving picture to display the moving picture, the method comprises the steps of: generating a first sub-frame and a second sub-frame from a frame of interest of a moving picture; detecting a difference between a picture of the first sub-frame and a picture of the second sub-frame; calculating a correction value by subtracting from the difference a cumulative value multiplied by a predetermined coefficient; accumulating, as the cumulative value, a value obtained by subtracting the correction value from the difference; and employing the correction value to correct the picture of the first sub-frame and the picture of the second sub-frame.

According to the aspect, in an image display apparatus for inverting the drive polarity for each sub-frame to display a picture, even if the pictures of adjacent sub-frames are different from each other, image data which suppresses accumulation of electrical charges in each display element can be generated.

Further features of the present invention will become apparent from the following description of exemplary embodiments with reference to the attached drawings.

BRIEF DESCRIPTION OF THE DRAWINGS

FIG. 4A is a graph showing an example of the luminance waveform in the "sub-frame display method based on spatial frequency separation";

FIG. 4B is a graph showing an example of the voltage waveform when double speed-frame inversion is executed in FIG. 4A;

FIG. 5 is a view showing an example of the picture pattern;

DESCRIPTION OF THE EMBODIMENTS

The present invention will be described in detail below based on preferred embodiments with reference to the accompanying drawings. Arrangements set forth in the following embodiments are merely examples, and the present invention is not limited to the illustrated arrangements.

First Embodiment

Outline of Operation

An outline of the first embodiment according to the present invention will be explained. The first embodiment proposes an improvement in the "sub-frame display method based on spatial frequency separation".

An image display apparatus which displays display image data generated by an image processing apparatus according to the first embodiment implements the "sub-frame display method based on spatial frequency separation". More specifically, the image display apparatus displays a picture by driving one by one the display elements of a liquid crystal panel having counter electrodes. The image display apparatus separates one frame of a moving picture into a plurality of sub-frames, and executes frame inversion type AC driving to invert the drive polarity for each sub-frame.

The image display apparatus according to the first embodiment displays a picture signal having a frame rate of 60 Hz at a display refresh rate of 120 Hz. That is, the image processing apparatus according to the first embodiment generates two sub-frames of a 1/120-sec frame from a signal of a 60-Hz frame rate.

Figure 1:
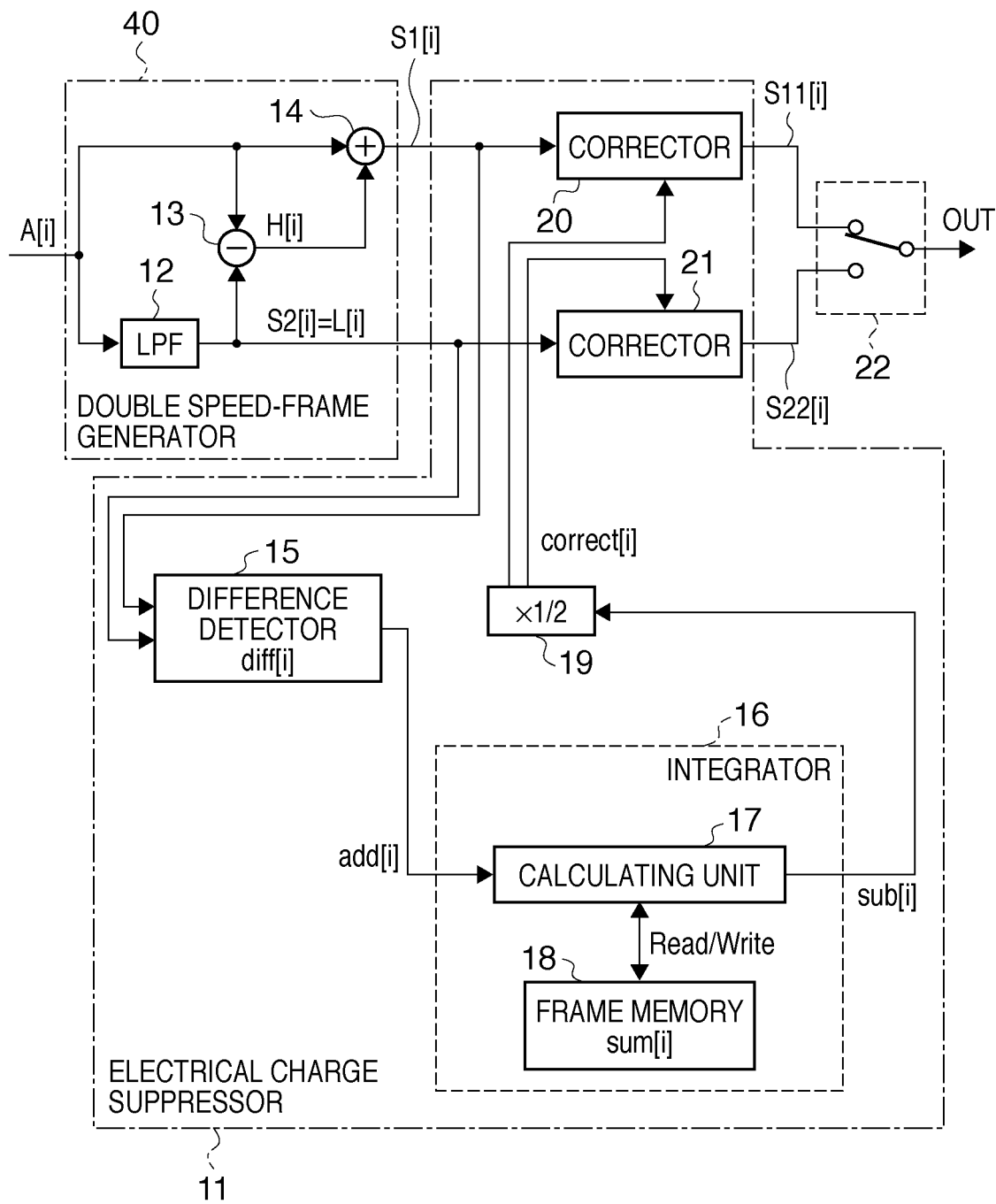
FIG. 1 is a block diagram showing the arrangement of an image processing apparatus according to the first embodiment.

FIG. 1 is a block diagram showing the arrangement of the image processing apparatus according to the first embodiment. In the image processing apparatus, a double speed-frame generator 40 generates two sub-frames from an input picture A[i]. When outputting the two sub-frames via a switch 22, an electrical charge suppressor 11 controls accumulation of electrical charges in the sub-frame period. Details of each unit shown in FIG. 1 will be described later.

Figure 3:
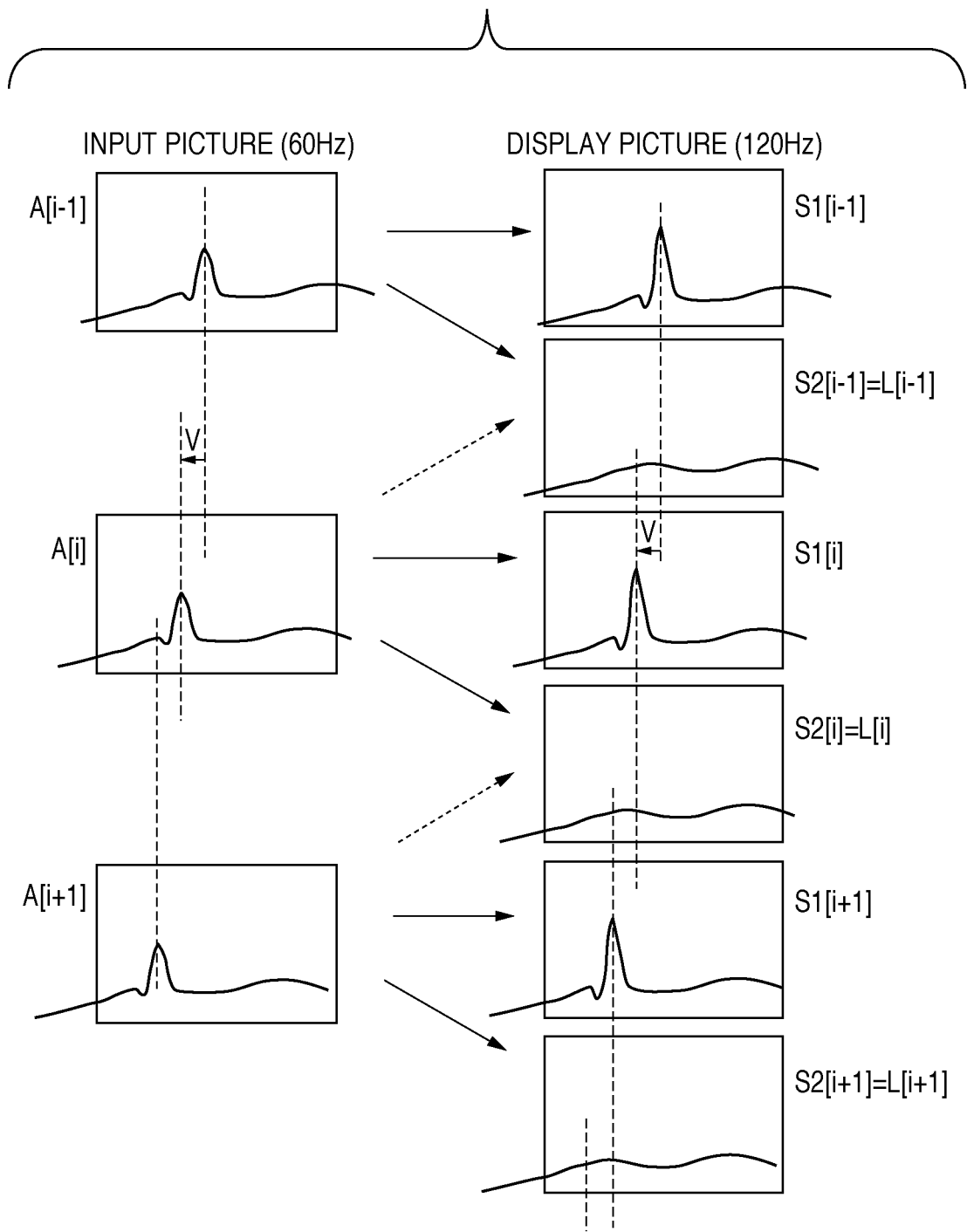
FIG. 3 is a graph showing an example of the waveforms of the images of an input frame and sub-frame along the time axis.

FIG. 3 shows the waveform of the input picture A[i] shown in FIG. 1, and the waveforms of signals S1[i] and S2[i] which are generated based on the input picture A[i] and correspond to the first and second sub-frames before correction by the electrical charge suppressor 11. These waveforms are aligned vertically in time series. [i] means the ith frame of an input picture or a picture corresponding to the ith frame. The arithmetic expressions of the signals S1[i] and S2[i] of sub-frames shown in FIG. 3 will be described later.

In FIG. 3, assume that the object of the input picture A[i] moves to the left at a moving speed V (pixels/frame). If this object is pursued, the moving object seems to be a still picture. If, however, A[i] is displayed for, for example, a 1/60 sec, a motion blur corresponding to this period is observed. To prevent this, the high spatial frequency component which concerns the motion blur (or at which the motion blur becomes conspicuous) is concentrated to one sub-frame by the "sub-frame display method based on spatial frequency separation". This can reduce the motion blur while keeping the low spatial frequency component displayed (e.g., displayed by the two sub-frames), suppressing generation of flicker and a decrease in luminance.

FIG. 4A shows a luminance waveform in the "sub-frame display method based on spatial frequency separation". It is apparent from FIG. 4A that the H component (hatched portion) serving as a high spatial frequency component is concentrated to one sub-frame. FIG. 4B shows a voltage waveform when double speed-frame inversion is executed in FIG. 4A. The luminance waveform reflects the drive voltage, and is equivalent to the absolute value of the voltage waveform. These waveforms will also be called a drive waveform. In FIG. 4B, the signal S1[i] corresponding to the first sub-frame is driven by a positive voltage, whereas the signal S2[i] corresponding to the second sub-frame is driven by a negative voltage. In FIGS. 4A and 4B, the H component (hatched portion) serving as a high spatial frequency component is positive to increase the luminance. However, the H component is sometimes negative to decrease the luminance. When the H component is negative, the sub-frame is driven at a frequency obtained by subtracting the H component from an L component (dotted portion) serving as a low spatial frequency component.

In FIG. 4B, the DC balance of the entire drive waveform distorts. A drive voltage (hatched portion) corresponding to the H component is added to only one sub-frame. Thus, the positive and negative sides of the voltage waveform are not symmetrical, and the voltage waveform is offset to the positive side by the H component. If the drive waveform has such an offset, a small amount of electrical charges is accumulated in the display element for each frame. A residue image or the like is generated over time, adversely affecting the picture and degrading the liquid crystal characteristic.

The first embodiment cancels accumulation of electrical charges owing to the distortion of the DC balance by vertically correcting the voltage of the drive waveform while maintaining a predetermined time response characteristic.

The offset can also be canceled by simply correcting the drive waveform. This is the same as normal frame inversion type driving, and there is not much point in adopting the "sub-frame display method based on spatial frequency separation".

The first embodiment monitors the offset value of an actual luminance signal per frame, that is, the cumulative value of the difference between the signals of the first and second sub-frames. The cumulative value is regarded to be proportional to the actual amount of electrical charge accumulation, and the voltage of the drive waveform is vertically corrected in accordance with the cumulative value, that is, the amount of electrical charge accumulation. This can prevent an increase in accumulated electrical charges, and cancel accumulation of electrical charges over time.

Details of Operation

Prior to a detailed description of the basic operation of the first embodiment, a prior art corresponding to the embodiment will be explained for easy understanding of the embodiment.

Figure 17:
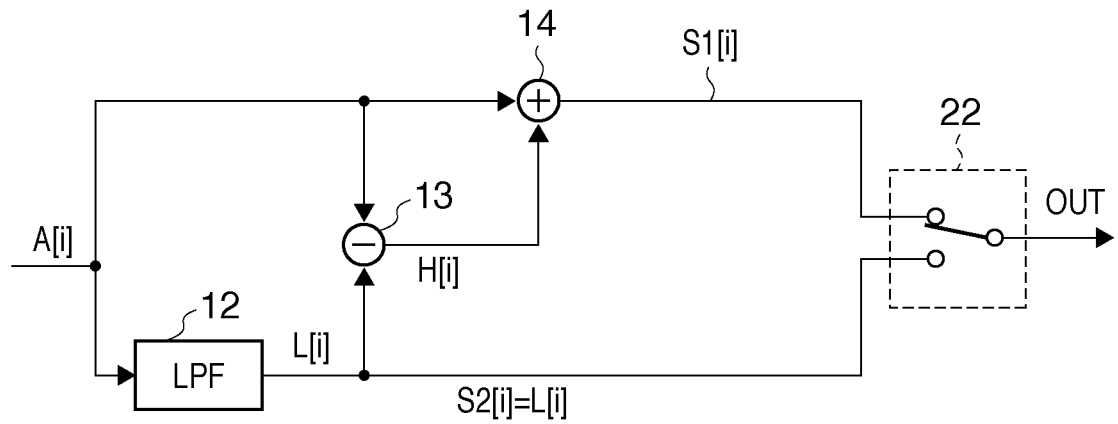
FIG. 17 is a block diagram showing the arrangement of a conventional image processing apparatus for generating display image data.

FIG. 17 is a block diagram showing an example of applying the "sub-frame display method based on spatial frequency separation" to a conventional image processing apparatus for generating display image data. In FIG. 17, a lowpass filter (LPF) 12 receives the input picture A[i] of an input frame of interest, and generates a low spatial frequency component L[i]. From the low spatial frequency component L[i] and the original input picture A[i], a subtracter 13 and adder 14 generate a high spatial frequency component H[i], first sub-frame signal S1[i], and second sub-frame signal S2[i] based on the following equations. In other words, the LPF 12, subtracter 13, and adder 14 generate sub-frames. In the following equations, LPF( ) represents a two-dimensional lowpass filter.

$$L[i] = LPF(A[i]) \tag{1-0}$$

$$S1[i] = A[i] + H[i] \tag{1-1-1}$$

$$= L[i] + 2H[i] \tag{1-1-2}$$

$$S2[i] = L[i] \tag{1-2}$$

In FIG. 17, the first sub-frame signal S1[i] and second sub-frame signal S2[i] are sent to the switch 22 which switches at intervals of 1/120 sec, and are alternately output.

The operation of the image processing apparatus according to the first embodiment will be explained with reference to FIG. 1. In the arrangement of FIG. 1, the electrical charge suppressor 11 surrounded by a chain line is added to the conventional arrangement shown in FIG. 17. In the arrangement shown in FIG. 1, the electrical charge suppressor 11 monitors the sub-frame signals S1[i] and S2[i] generated by the same way as that in FIG. 17, and calculates a correction value. Then, correctors 20 and 21 generate first and second sub-frame signals S11[i] and S22[i] by correcting the signals S1[i] and S2[i] based on the correction value. The corrected signals S11[i] and S22[i] are switched by the switch 22, and alternately output.

The arrangement and operation of the electrical charge suppressor 11 will be explained.

The first and second sub-frame signals S1[i] and S2[i] are input to a difference detector 15. The difference detector 15 calculates the difference between these signals, that is, a difference picture diff[i] by subtracting the picture of the second sub-frame from that of the first sub-frame (equation 2-3).

An integrator 16 integrates the difference picture diff[i] calculated by the difference detector 15 for each frame, and outputs a picture (corrected picture) of a value proportional to the integral value. In the following description, the input difference value is represented as an addition value add[i], and the output corrected picture is represented as a subtraction value sub[i].

$$diff[i] = S1[i] - S2[i] \quad (2\text{-}3)$$
$$= add[i] \quad (2\text{-}4)$$

The integrator 16 includes a calculating unit 17 and frame memory 18, and determines the subtraction value sub[i] representing a sub-frame correction amount based on the addition value add[i] and cumulative value sum[i]. This processing is executed independently for each pixel of image data.

The correctors 20 and 21 correct the first and second sub-frame signals, respectively. At this time, the correction value correct[i] is a value obtained by multiplying the subtraction value sub[i] by ½ by a multiplier 19 (equation 2-5). After calculating the correction value correct[i], it is subtracted from the first sub-frame signal (equation 2-6-1), and added to the second sub-frame signal (equation 2-6-2). By this correction, the value obtained by subtracting the second sub-frame signal from the first sub-frame signal becomes smaller by the subtraction value sub[i], and serves as a corrected DC offset value.

$$correct[i]=sub[i]/2 \quad (2\text{-}5)$$
$$S11[i]=S1[i]-correct[i] \quad (2\text{-}6\text{-}1)$$
$$S22[i]=S2[i]+correct[i] \quad (2\text{-}6\text{-}2)$$

The correction by the correctors 20 and 21 is not limited to addition and subtraction. The correctors 20 and 21 suffice to correct the first and second sub-frame signals so as to decrease the difference between their absolute values.

Procedures to calculate the subtraction value sub[i] and the cumulative value sum[i] of the difference picture by the integrator 16 will be explained. All calculation operations are done independently for each pixel, and are not correlated between pixels.

The calculating unit 17 executes calculation based on a recurrence formula (2-7):

$$sum[i+1]-sum[i]=add[i]-sub[i] \quad (2\text{-}7)$$

where sum[i] is the cumulative value of the difference picture of the ith frame, and corresponds to electrical charges accumulated owing to the distortion of the DC balance of a picture actually displayed on the liquid crystal panel. The frame memory 18 holds the cumulative value sum[i].

The left side of formula 2-7 represents a change of the cumulative value sum per frame. add[i] on the right side is input from the difference detector 15, and added to sum[i] for each frame. sub[i] is subtracted from sum[i] for each frame. In other words, a value obtained by subtracting the subtraction value sub[i] from the addition value add[i] is accumulated as the cumulative value sum[i]. From equation (2-5), sub[i] is double the correction value correct[i] in the correctors 20 and 21.

A method of determining the subtraction value sub[i] in the integrator 16 will be explained. The first embodiment assumes a system exhibiting a phenomenon similar to charging/discharging of the capacitor, that is, a system which satisfies a first order linear differential equation.

The discharge amount (subtraction amount) sub[i] must be defined as an amount proportional to the cumulative value sum[i] at that time:

$$sub[i]=\alpha \times sum[i] \ (0<\alpha<1) \quad (2\text{-}8)$$

Substituting equation (2-8) into formula (2-7) yields $$sum[i+1]-sum[i]=add[i]-\alpha \times sum[i] \quad (2\text{-}9)$$

Recurrence formula (2-9) has the same meaning as differential equation (2-10):

$$dsum(t)/dt=add(t)-\alpha \times sum(t) \quad (2\text{-}10)$$

In equations up to formula (2-9), the time axis is represented in the form of the ith frame using [i]. To the contrary, equation (2-10) is a function of the time using (t). Substituting a predetermined value into add(t) in equation (2-10) yields a solution expressed by an exponential function which starts from an initial value and converges to the predetermined value. Actual calculation is sequentially done in accordance with recurrence formula (2-9) as the frame advances to the next one.

The proportionality coefficient α is a positive constant, and is defined as 0<α<1. The value α greatly changes the behavior in the first embodiment, so α needs to be set to an appropriate value in accordance with the characteristics of the liquid crystal panel. When α is relatively large, the response of sub[i] to add[i] is quickened, and the cumulative value (corresponding to electrical charges actually accumulated in the device) in the frame memory 18 is suppressed relatively small. When α is relatively small, the response of sub[i] to add[i] is slowed, and the cumulative value in the frame memory 18 becomes relatively large.

A slow response of sub[i] to add[i] is preferable because a problem arising from correction in the embodiment hardly influences the image quality, or the effect of the "sub-frame display method based on spatial frequency separation" is fully exploited. In this case, however, the cumulative value tends to always be large, so the electrical charge accumulation state readily appears in a picture.

From this, the value α is desirably set to a proper value depending on the case. In the following concrete example, α=0.1.

Concrete Operation

A concrete operation in the first embodiment will be described below. FIG. 5 shows a picture pattern used in the following description. FIG. 5 shows a picture pattern in which a stripe pattern made up of 1-pixel wide dark lines 150 (luminance: 30%) and 1-pixel wide bright lines 151 (luminance: 70%) moves at a speed V of one pixel per frame in a direction perpendicular to the lines 150 and 151. At this time, the low frequency component L separated by the "sub-frame display method based on spatial frequency separation" represents a luminance of 50%, the high frequency component H of the bright stripe represents a luminance of 20%, and that of the dark stripe represents a luminance of −20%.

Figure 10A:
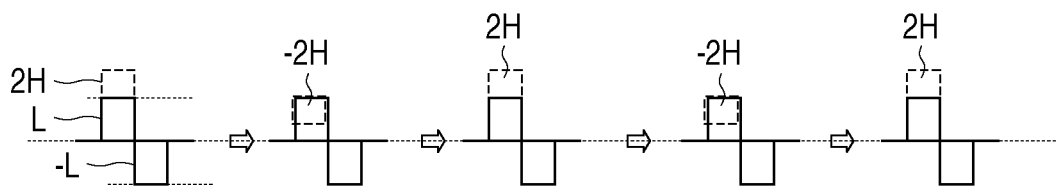
FIGS. 10A to 10D are waveform charts showing examples of the drive waveform of frame inversion type AC driving according to the first embodiment.

Since the stripe pattern shown in FIG. 5 moves at the speed V of one pixel per frame, the drive waveform which pays attention to a specific pixel 152 changes for each frame, as shown in FIG. 10A. In this case, the distortion of the DC balance between the first and second sub-frames equals 2H. This distortion switches between the positive polarity and the negative polarity every frame, so no electrical charge is accumulated.

However, if the stripe pattern stops moving while the distortion of 2H is positive, the DC balance of the drive waveform, which pays attention to the pixel 152, is kept distorted by 2H in the positive direction. In this case, electrical charges are accumulated in the positive direction in the pixel 152. In contrast, if the stripe pattern stops moving while the distortion of 2H is negative, the DC balance of the drive waveform, which pays attention to the pixel 152, is kept distorted by 2H in the negative direction. Electrical charges are accumulated in the negative direction in the pixel 152.

Figure 10B:
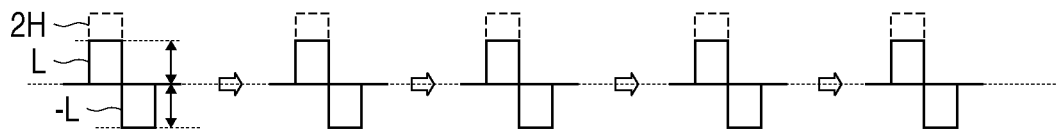

According to the first embodiment, a drive waveform whose DC balance distorts as shown in FIG. 10B is corrected with a predetermined time constant. This correction controls the drive waveform to restore the DC balance between the positive and negative directions after a predetermined time (predetermined number of frames). When the distortion of the DC balance of the drive waveform is canceled, further accumulation of electrical charges is suppressed. Correction processing in the first embodiment will be described below.

Figure 10C:
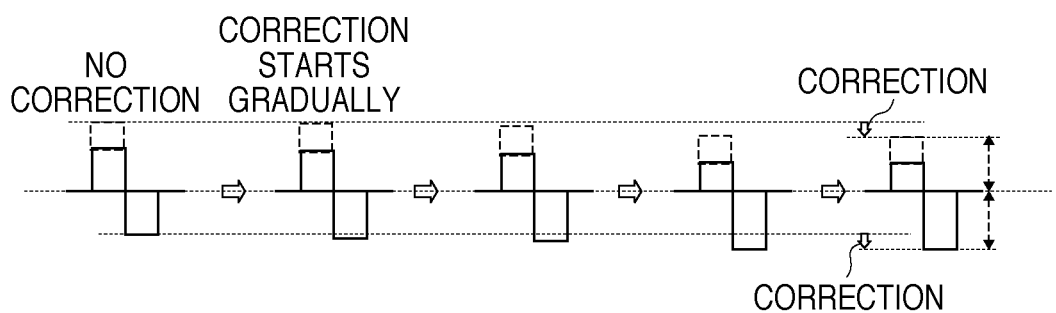

FIG. 10C is a view showing a state in which correction in the first embodiment starts. The left end of FIG. 10C shows a drive waveform (corresponding to an odd-numbered waveform in FIG. 10A or an even-numbered waveform in FIG. 10B) immediately after the stripe pattern stops moving. This drive waveform shifts in the negative direction after a predetermined number of frames, and stabilizes when the correction amount reaches a predetermined value, as shown at the right end of FIG. 10C. At the right end of FIG. 10C, that is, when the drive waveform reaches the stable state, the correction amount becomes half of 2H, that is, H. At this timing, the DC balance of the drive waveform is restored, preventing further accumulation of electrical charges.

Figure 10D:
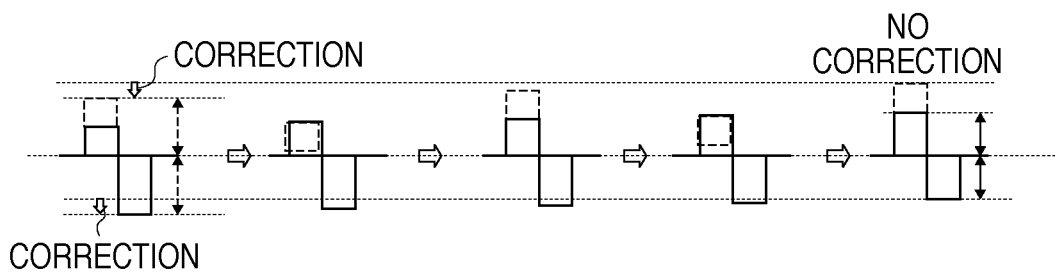

The left end of FIG. 10D shows a drive waveform immediately after the stripe pattern starts moving again from the stopped state. While the picture moves, 2H switches alternately between the positive and negative directions, no electrical charge is accumulated, and no correction need be performed. Hence, after the stripe pattern starts moving, correction is gradually canceled, and the drive waveform returns to one shown at the right end of FIG. 10D after a predetermined number of frames (after four frames in the example of FIG. 10D).

As long as the stripe pattern moves, 2H repeats the positive and negative polarities, and the state in which no DC balance distorts can be maintained.

Figure 6:
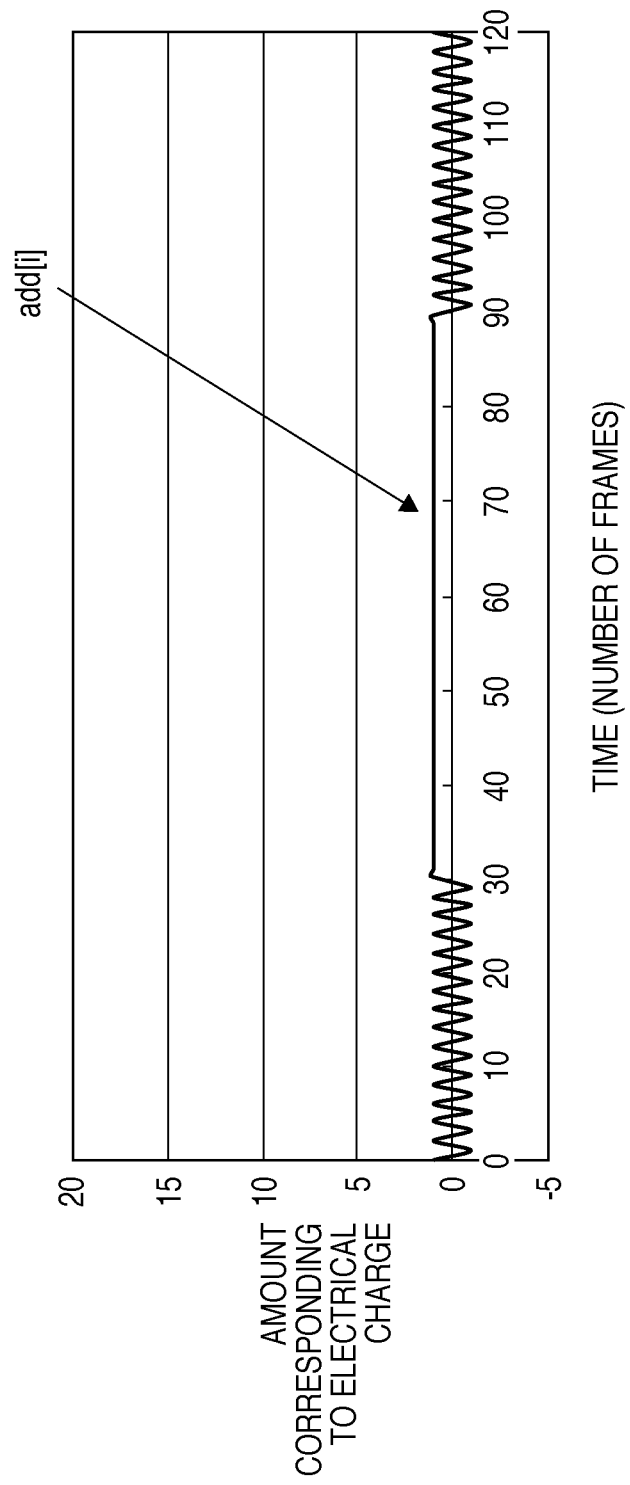
FIGS. 6 to 9 are graphs for explaining temporal transition of electrical charge accumulation.
Figure 7:
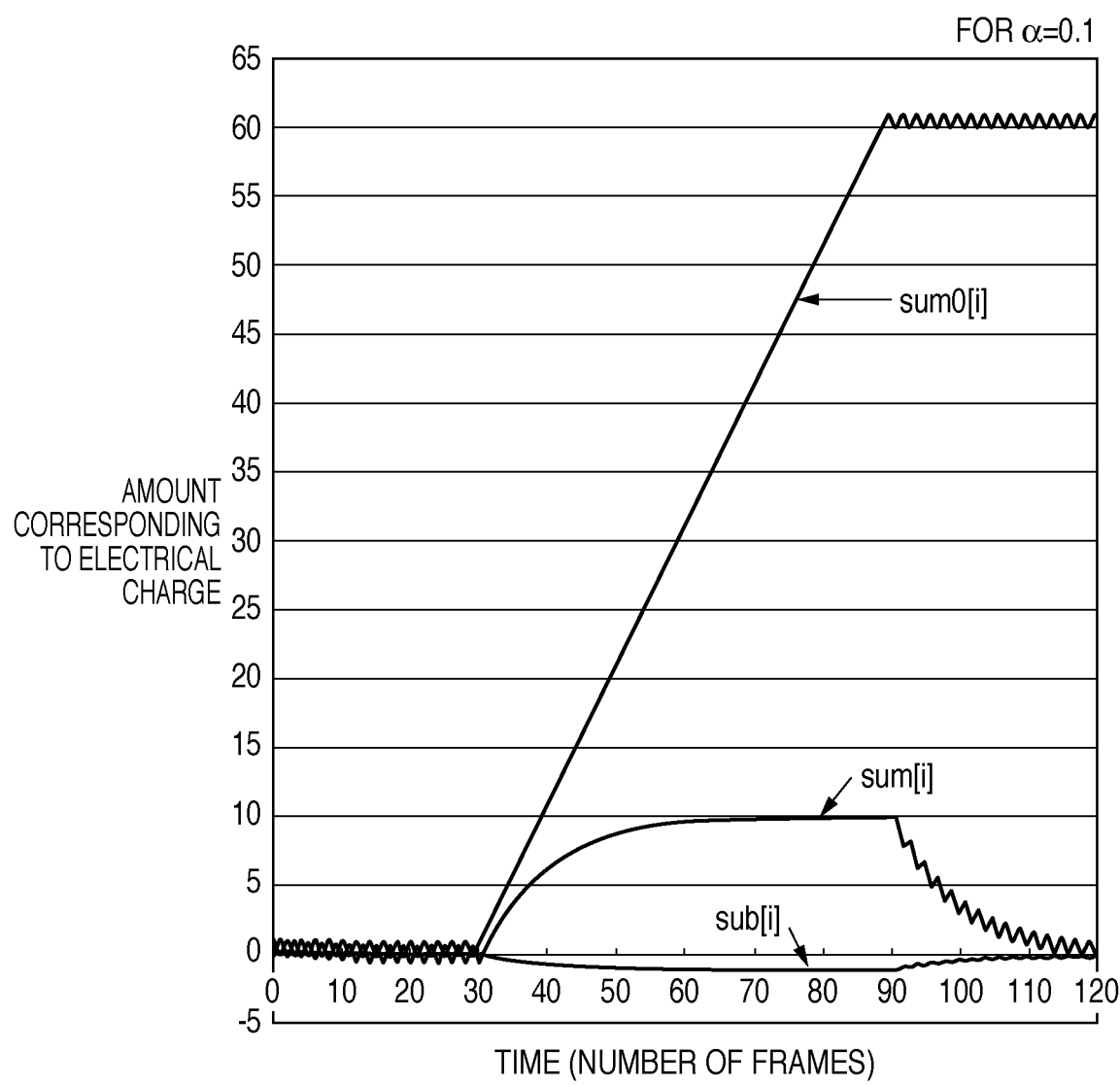

FIGS. 6 and 7 are graphs for explaining temporal transition of electrical charge accumulation.

FIG. 7 shows a case where $\alpha=0.1$ in formula (2-9). In FIGS. 6 and 7, the abscissa axis represents the number of frames, and the ordinate axis represents the relative amount when the amount corresponding to electrical charge accumulated by one frame is set to 1. In this case, all parameters can be represented by the same scale. This also applies to FIGS. 8, 9, 13, and 14 to be described later.

The stripe pattern shown in FIG. 5 moves as follows. First, during the period of frame numbers 0 to 30, the stripe pattern shown in FIG. 5 moves at the speed V of one pixel per frame in a direction perpendicular to the lines 150 and 151. During the period of frame numbers 31 to 90, the stripe pattern stops moving. From frame number 91, the stripe pattern starts moving again.

FIG. 6 shows a change of the addition value add[i] (=diff[i]) in the stripe pattern. As shown in FIG. 6, the addition value add[i] repeats the positive and negative polarities (accumulation and discharging) during the period of frame numbers 0 to 30 and the period from frame number 90, but keeps the positive polarity (accumulation) during the period of frame numbers 31 to 90.

FIG. 7 shows an uncorrected cumulative value sum0[i] of electrical charges when correction according to the first embodiment is not applied, the cumulative value sum[i] of electrical charges when correction according to the first embodiment is applied, and the subtraction value sub[i].

As shown in FIG. 7, the uncorrected cumulative value sum0[i] linearly increases during the period of frame numbers 31 to 90 during which the stripe pattern stands still. In a general liquid crystal microdisplay, if this state continues for several minutes, accumulation of electrical charges exceeds a predetermined level, and a serious problem occurs in the display apparatus such that a residue image remains.

Even at the cumulative value sum[i] when correction according to the first embodiment is applied, accumulation of electrical charges starts immediately after the stripe pattern stops moving (near frame numbers 30 to 40). After that (after 20 to 30 frames), accumulated electrical charges reach a predetermined value, and then accumulation of electrical charges is suppressed.

From frame number 91, the stripe pattern starts moving again. The cumulative value sum[i], which has reached the equilibrium point, starts decreasing (electrical charges are discharged), and converges to 0 (state in which no electrical charge is accumulated). Even if the stripe pattern keeps still from frame number 91, accumulated electrical charges do not increase once they have reached the equilibrium point. To the contrary, if the stripe pattern keeps still, the uncorrected cumulative value sum0[i] increases, and even if the stripe pattern starts moving again, it maintains a value (accumulated electrical charges) at the restart point. In short, unless correction according to the first embodiment is executed, no accumulated electrical charge is discharged as long as the stripe pattern is repeated.

In FIG. 7, the curve shown at the bottom represents the subtraction value sub[i]. Since $\alpha=0.1$, the subtraction value sub[i] is 1/10 of the cumulative value sum[i], and has an opposite sign. After accumulated electrical charges reach the equilibrium point near frame number 60, the addition value add[i] (FIG. 6) and subtraction value sub[i] (FIG. 7) converge to the same value.

The first embodiment has described the case where $\alpha=0.1$. A behavior when $\alpha$ is set to a slightly large or small value will be explained.

Figure 8:
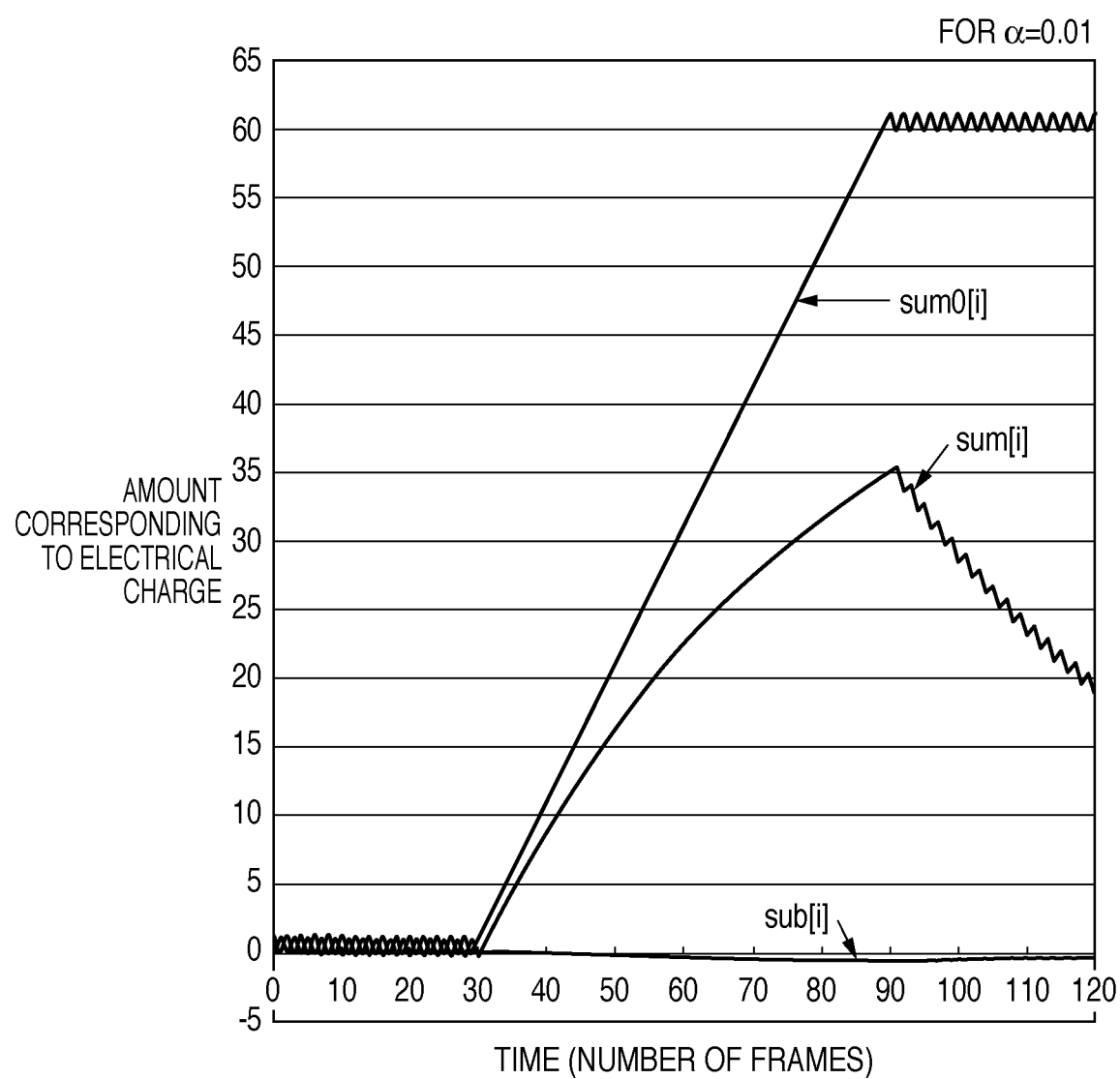
Figure 9:
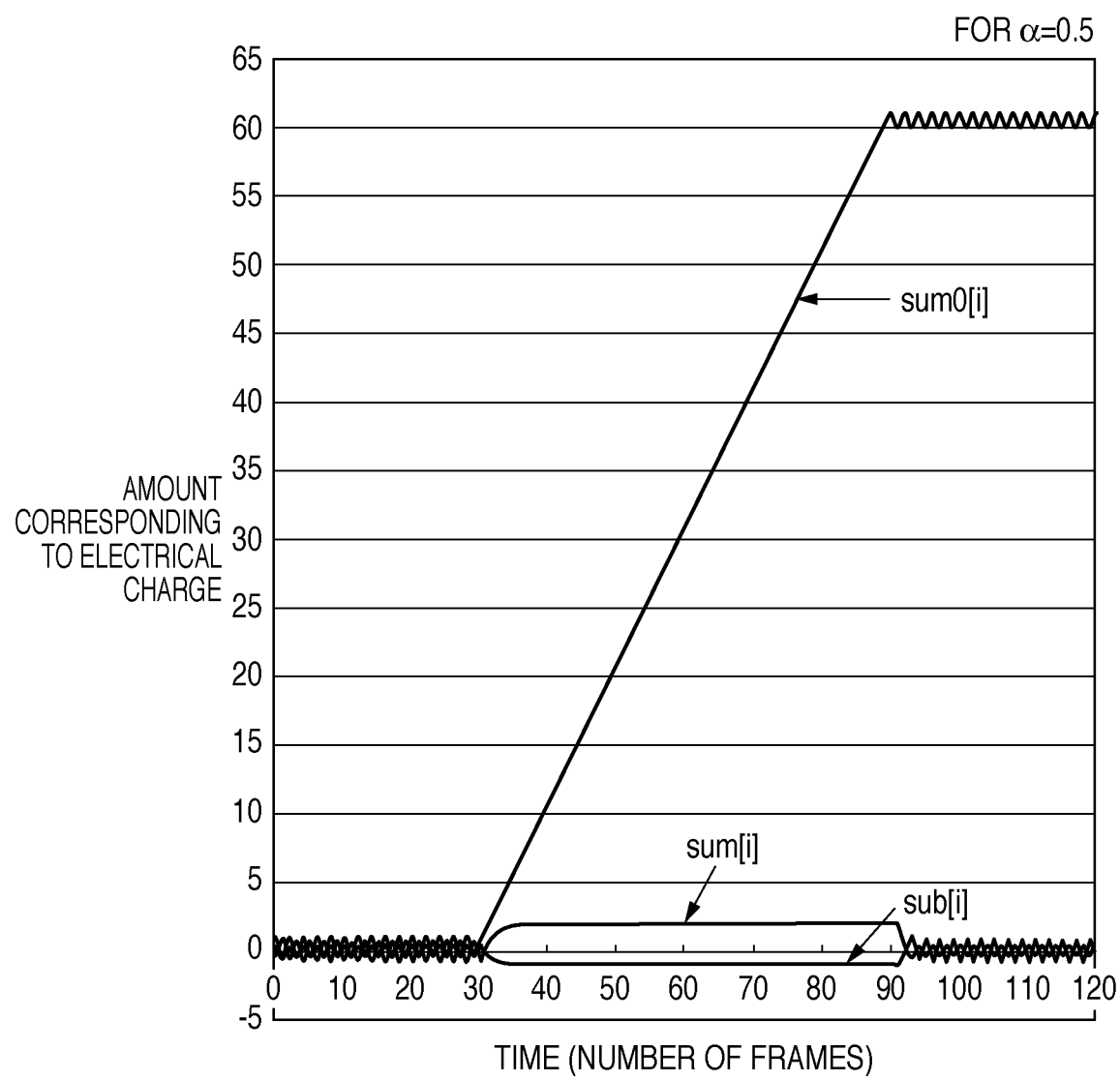

FIG. 8 shows a case where $\alpha=0.01$. FIG. 9 shows a case where $\alpha=0.5$.

As shown in FIG. 8, when $\alpha$ is relatively small, the subtraction value sub[i] (discharge amount) is small. The cumulative value sum[i] does not quickly converge, and the value at which the cumulative value sum[i] converges is large. If the convergence value is excessively large, a residue image as described above appears. Even if the picture starts moving again, a long time is taken to decrease the cumulative value sum[i] (discharge electrical charges), and this poor response characteristic influences the picture.

As shown in FIG. 9, when $\alpha$ is relatively large, the subtraction value sub[i] (discharge amount) is large. The cumulative value sum[i] quickly converges, and the value at which the cumulative value sum[i] converges is small. In this case, the correction amount of the drive waveform acutely changes. For example, even if the luminance level of a specific pixel in a moving picture shows the same value for a very short time, correction acts, and the influence of correction appears and is recognizable as an improper pattern of the moving picture.

As described above, an excessively small or large value $\alpha$ adversely influences the image quality, so the value $\alpha$ is desirably set to an optimum value in accordance with the liquid crystal panel.

As described above, the first embodiment vertically corrects the voltage of the drive waveform in accordance with the electrical charge accumulation amount which is the cumulative value of the difference between the first and second sub-frames as an offset value per frame. This correction (control) corresponding to the electrical charge accumulation amount is executed in the "sub-frame display method based on spatial frequency separation". The first embodiment can prevent an increase in accumulated electrical charges, cancel accumulation of electrical charges, and preferably display a moving picture on the liquid crystal panel.

Second Embodiment

The second embodiment according to the present invention will be described. The second embodiment will explain electrical charge accumulation control capable of more preferable moving picture playback.

Figure 18:
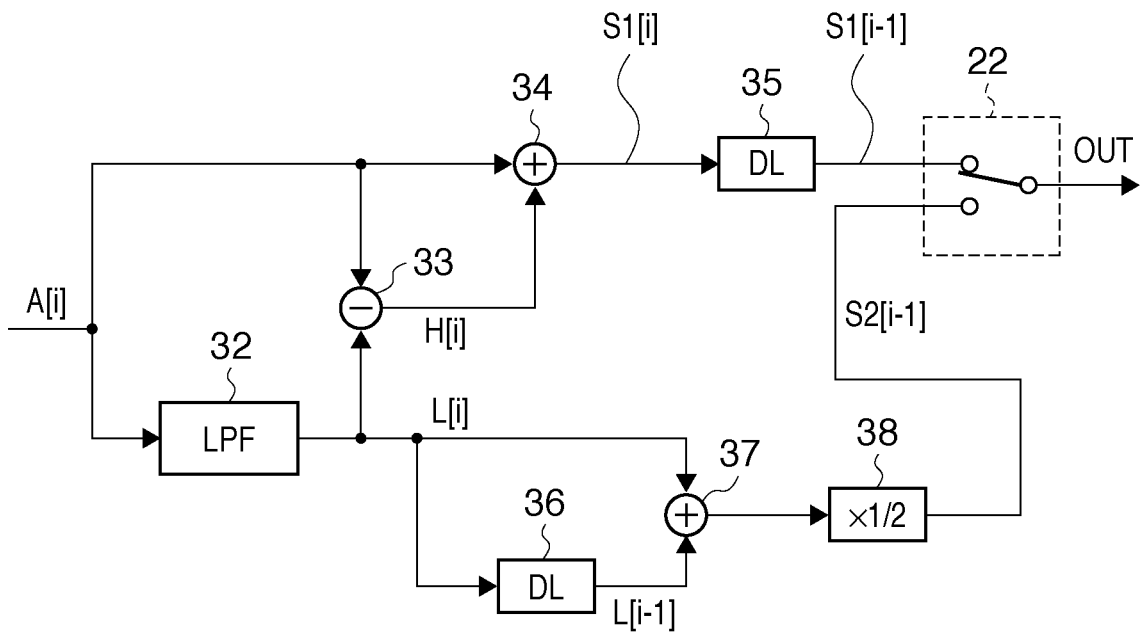
FIG. 18 is a block diagram showing the arrangement of an image processing apparatus proposed by the present applicant for implementing the "sub-frame display method based on spatial frequency separation".

The present applicant has proposed a technique which improves the conventional "sub-frame display method based on spatial frequency separation" shown in FIG. 17. FIG. 18 is a block diagram showing the arrangement of an image processing apparatus proposed by the present applicant for implementing the "sub-frame display method based on spatial frequency separation".

In the arrangement shown in FIG. 17, the center of gravity of the luminance area changes in the time direction between the display of the high frequency component H[i] and that of the low frequency component L[i], as shown in FIG. 4A. This causes an asymmetrical distortion (so-called tailing-blur) in a direction in which a pursued object moves, and an opposite direction. In the arrangement shown in FIG. 18, generation of the asymmetrical distortion is suppressed by setting the second sub-frame to the average value of the low frequency components of adjacent frames. The second embodiment executes the same electrical charge accumulation control as that in the first embodiment so as not to adversely influence the arrangement shown in FIG. 18.

In the arrangement shown in FIG. 18, an LPF 32 receives an input picture signal A[i] to generate a low spatial frequency component L[i] (equation 3-0). From the low spatial frequency component L[i] and the original input picture signal A[i], a subtracter 33 and adder 34 generate a high spatial frequency component H[i] and first sub-frame signal S1[i] (equations 3-1-1 and 3-1-2). A delay circuit (DL) 35 receives the signal S1[i] to output S1[i−1] of an immediately preceding frame. A delay circuit (DL) 36 receives L[i] generated by the LPF 32 to output L[i−1] of an immediately preceding frame (equation 3-2). An adder 37 adds L[i−1] and L[i], and a multiplier 38 multiplies the sum by ½ to generate a second sub-frame signal S2[i−1] of the (i−1)th frame (equation 3-3). The first sub-frame signal S1[i] and second sub-frame signal S2[i−1] are sent to a switch 22 which switches at intervals of 1/120 sec, and are alternately output.

In the following equations, DL( ) means that the current frame value is saved and the value of an immediately preceding frame is output. LPF( ) represents a two-dimensional lowpass filter.

$$L[i] = LPF(A[i]) \tag{3-0}$$

$$S1[i] = A[i] + H[i] \tag{3-1-1}$$

$$= L[i] + 2H[i] \tag{3-1-2}$$

$$S1[i-1] = DL(S1[i]) \tag{3-1-3}$$

$$L[i-1] = DL(L[i]) \tag{3-2}$$

$$S2[i-1] = (L[i-1] + L[i])/2 \tag{3-3}$$

Figure 2:
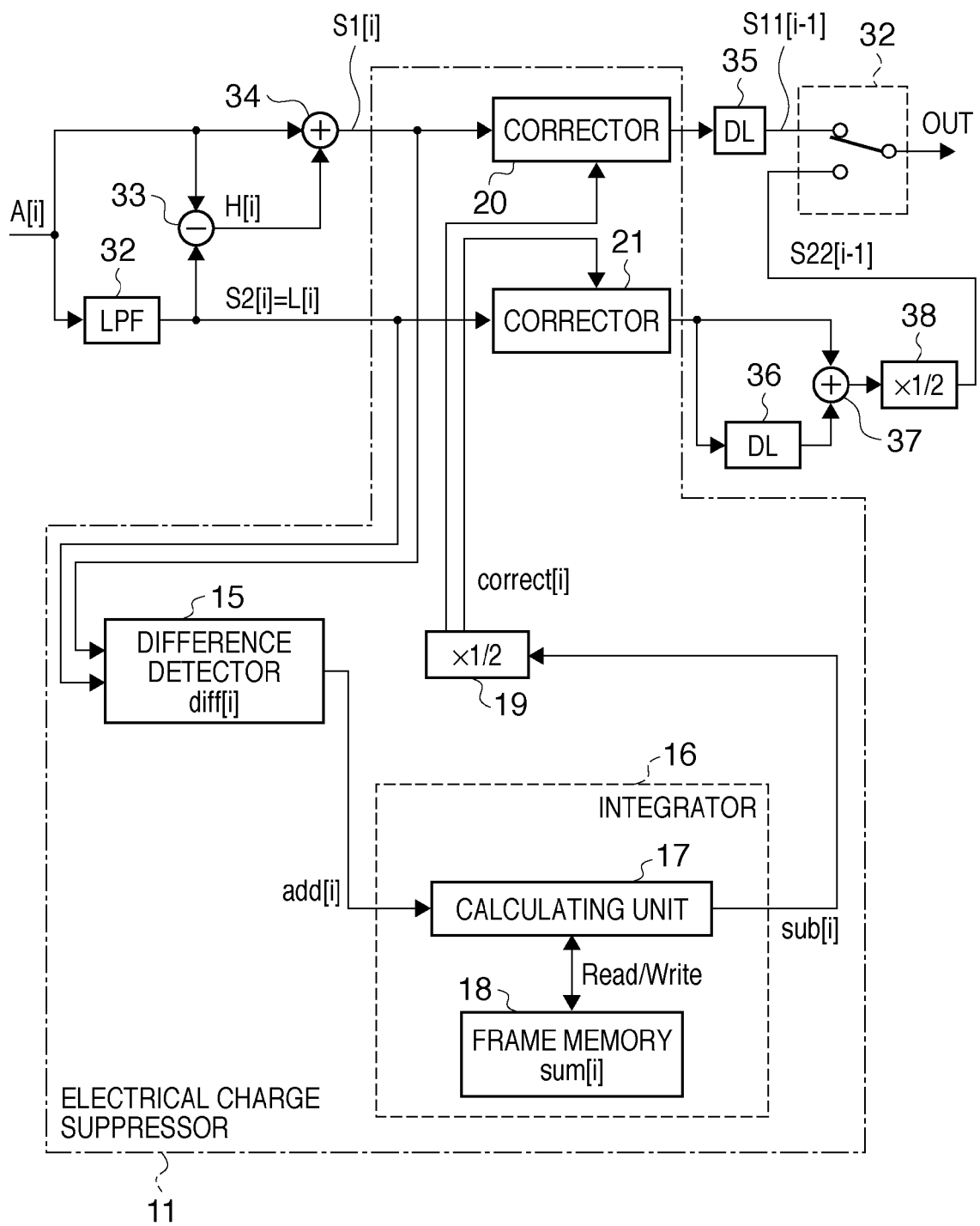
FIG. 2 is a block diagram showing the arrangement of an image processing apparatus according to the second embodiment.

FIG. 2 is a block diagram showing the arrangement of an image processing apparatus according to the second embodiment. In addition to the arrangement shown in FIG. 18, the image processing apparatus shown in FIG. 2 comprises an electrical charge suppressor 11 which performs the same control as that in the first embodiment. In the first embodiment, a signal sent to the switch 22 is monitored and corrected. In the second embodiment, signals sent to the DLs 35 and 36 are monitored and corrected. When correcting the signal S2[i−1], the low frequency component L[i] can undergo correction corresponding to the ith frame, and the low frequency component L[i−1] can undergo correction corresponding to the (i−1)th frame. Hence, proper correction free from any temporal shift can be done for S11[i] and S22[i].

The signals S11[i−1] and S22[i−1] obtained in this way are alternately output from the switch which switches at intervals of 1/120 sec.

All arithmetic expressions in the arrangement shown in FIG. 2 are $$L[i] = LPF(A[i]) \tag{4-0}$$

$$S1[i] = A[i] + H[i] \tag{4-1-1}$$

$$= L[i] + 2H[i] \tag{4-1-2}$$

$$L[i-1] = DL(L[i]) \tag{4-2-1}$$

$$S1[i-1] = DL(S1[i]) \tag{4-2-2}$$

$$S11[i-1] = S1[i-1] - \text{correct}[i-1] \tag{4-3-1}$$

$$S22[i-1] = \{(S2[i] + \text{correct}[i]) + (S2[i-1] + \text{correct}[i-1])\}/2 \tag{4-3-2}$$

The second embodiment has described an example of generating the signal S22[i−1] as the average of L[i−1], and L[i] of an immediately succeeding frame. This is an example of displaying (outputting) a signal S22 which contains information of one succeeding frame and is closer to the succeeding frame with respect to the signal S11. However, the second embodiment is also applicable to a case where a signal S22 which contains information of one preceding frame and is closer to the preceding frame. That is, if the signal S11 is not delayed, the signal S22 closer to a preceding frame with respect to the signal S11 is displayed. Letting i be the frame of interest of the signal S11, the signal S22 in the second embodiment is the average value of the low frequency components L of the frame i of interest and an immediately preceding frame i−1. Letting i−1 be the frame of interest of the signal S11, the signal S22 is the average value of the low frequency components L of the frame i−1 of interest and an immediately succeeding frame i. In other words, the signal S22 is generated as the average value of the low frequency components L of the frame of interest and either a preceding or succeeding frame temporally adjacent to the frame of interest.

As described above, the second embodiment can execute the same electrical charge accumulation control as that in the first embodiment for the arrangement which implements the "sub-frame display method based on spatial frequency separation" for suppressing an asymmetrical distortion generated in a direction in which a pursued object moves, and an opposite direction.

Third Embodiment

The third embodiment according to the present invention will be described. The third embodiment will explain an example of inverting a double speed-frame generated by the "intermediate picture insertion method based on motion compensation" serving as the first method of doubling the frame speed, and displaying the inverted frame on a microdisplay.

Figure 11:
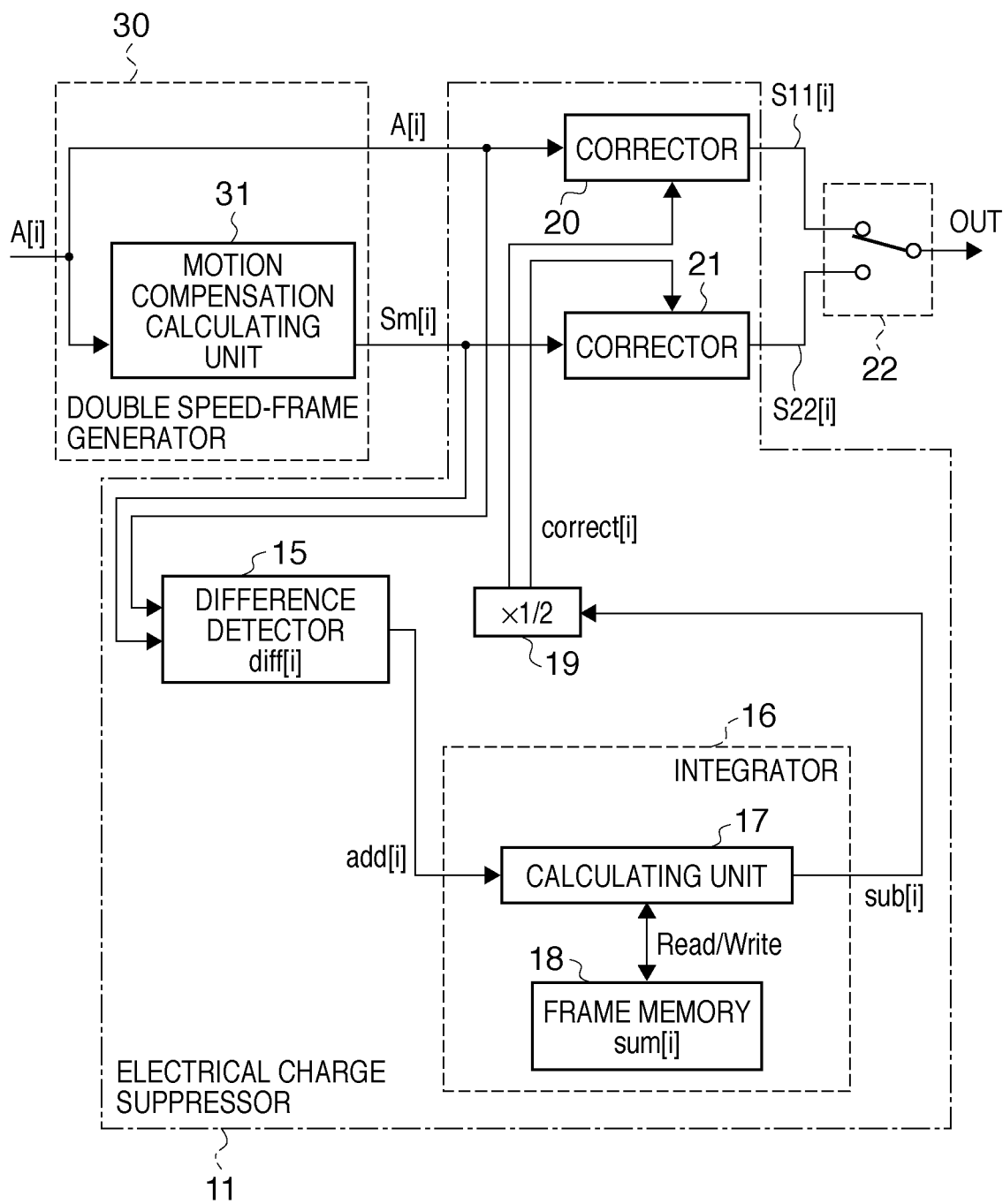
FIG. 11 is a block diagram showing the arrangement of an image processing apparatus according to the third embodiment.

FIG. 11 is a block diagram showing the arrangement of an image processing apparatus which implements the "sub-frame display method based on spatial frequency separation" according to the third embodiment. In FIG. 11, a double speed-frame generator 30 generates a double speed-picture by the "intermediate picture insertion method based on motion compensation". As the double speed-picture in the third embodiment, an input picture A[i] is displayed every other sub-frame, and an intermediate picture Sm[i] calculated by motion compensation is displayed between input pictures A[i]. In the third embodiment, the difference (addition value add[i]) between A[i] and Sm[i] is input to an integrator 16. The operation of the remaining arrangement is the same as that in the first embodiment, and a description thereof will not be repeated.

The "intermediate picture insertion method based on motion compensation" does not intentionally set a difference between sub-frame signals, unlike the "sub-frame display method based on spatial frequency separation". Hence, no apparent luminance level difference appears between the input picture A[i] and the intermediate picture Sm[i]. However, an inserted picture (intermediate picture) generated based on motion prediction is not always, as a picture which forms one frame, a picture of the same luminance level as that of the input picture A[i]. The third embodiment suppresses an increase in accumulated electrical charges when the luminance levels of an original picture and inserted picture (intermediate picture) statistically differ from each other in a long time in a variety of computational algorithms.

Figure 12:
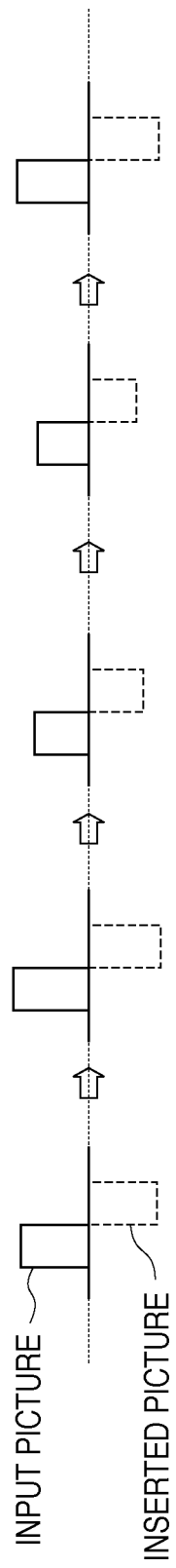
FIG. 12 is a waveform chart showing an example of the drive waveform of frame inversion type AC driving according to the third embodiment.

FIG. 12 shows a drive waveform according to the third embodiment. In FIG. 12, the solid line represents the drive waveform of the input picture A[i] displayed every other frame, and the broken line represents the drive waveform of an inserted image (intermediate picture Sm[i]) inserted between input pictures A[i]. In FIG. 12, the difference between the size of the solid line portion and that of the broken line portion (i.e., the distortion of the DC balance) is relatively small. However, the DC balance may distort after a long time.

Figure 13:
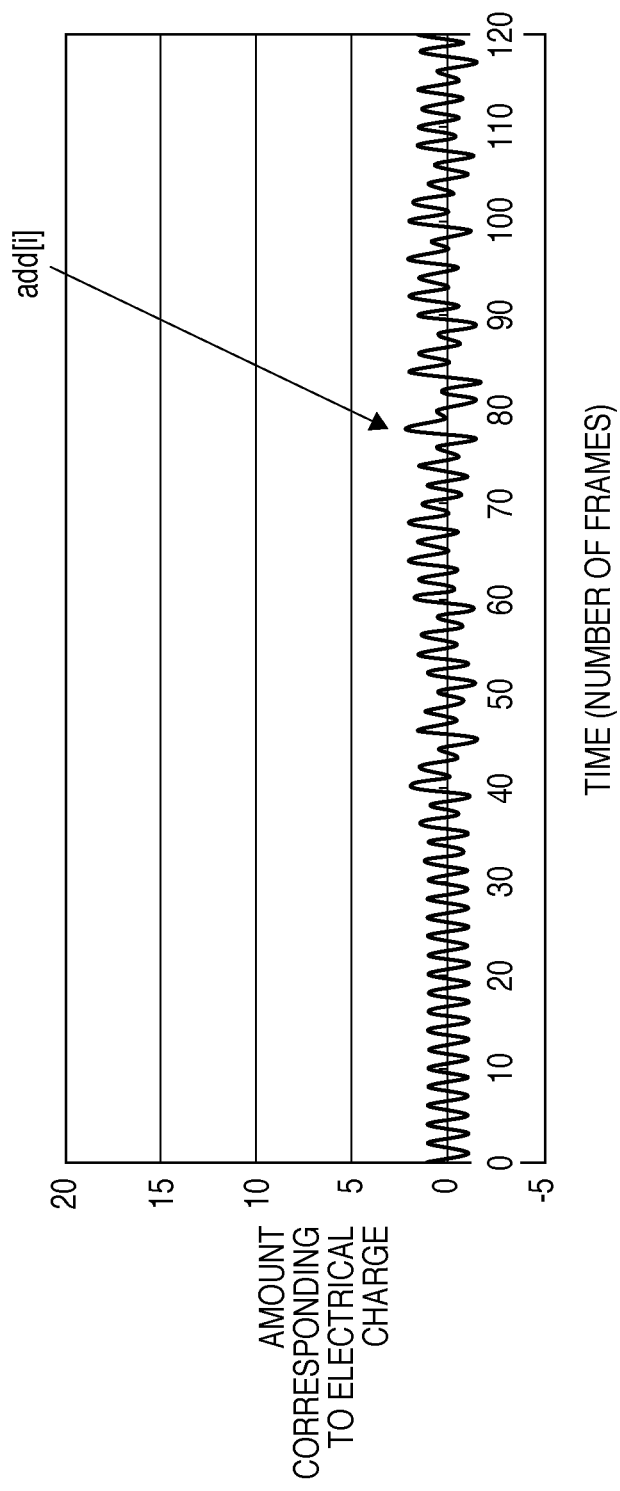
FIGS. 13 and 14 are graphs for explaining temporal transition of electrical charge accumulation.
Figure 14:
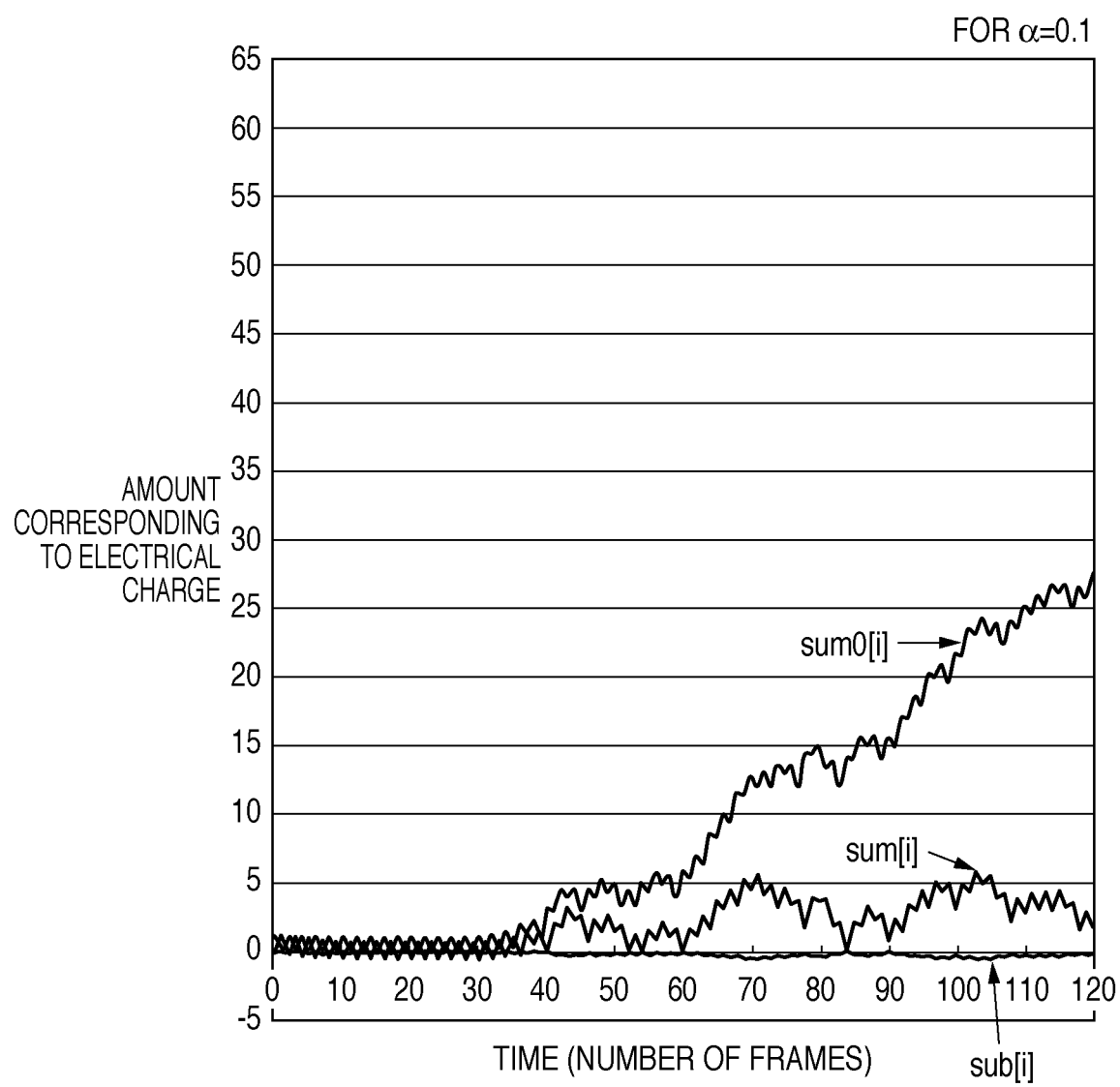

FIGS. 13 and 14 are graphs for explaining temporal transition of electrical charge accumulation when displaying a random picture in the third embodiment. FIG. 14 shows a case where $\alpha$=0.1. In FIGS. 13 and 14, during the period of frame numbers 0 to 30, the stripe pattern shown in FIG. 5 moves, and no DC offset occurs in the drive waveform. After frame number 31, the DC balance statically distorts owing to insertion of an intermediate picture into a picture by the "intermediate picture insertion method based on motion compensation".

In FIG. 13, the DC balance of the drive waveform seems not to distort even after frame number 31. However, it is apparent from FIG. 14 that a cumulative value sum0[i] when no accumulated electrical charge control is performed increases in the positive direction. That is, the DC balance of the drive waveform after frame number 31 in FIG. 13 slightly distorts.

By executing accumulated electrical charge control when inverting and displaying the frame of a double speed-picture by the "intermediate picture insertion method based on motion compensation", accumulation of electrical charges can be controlled to fall within a predetermined level without increasing the cumulative value sum[i], as shown in FIG. 14.

The third embodiment is not limited to a double speed-frame according to the "intermediate picture insertion method based on motion compensation". The third embodiment is applicable to any double-speed frame display apparatus which performs frame inversion and may statically suffer the distortion of the DC balance.

Fourth Embodiment

The fourth embodiment according to the present invention will be described. A feature of the fourth embodiment is to further reduce the difference between a cumulative value sum[i] representing the accumulation state of electrical charges in a frame memory 18, and the actual accumulation state of electrical charges on a liquid crystal display.

Figure 15:
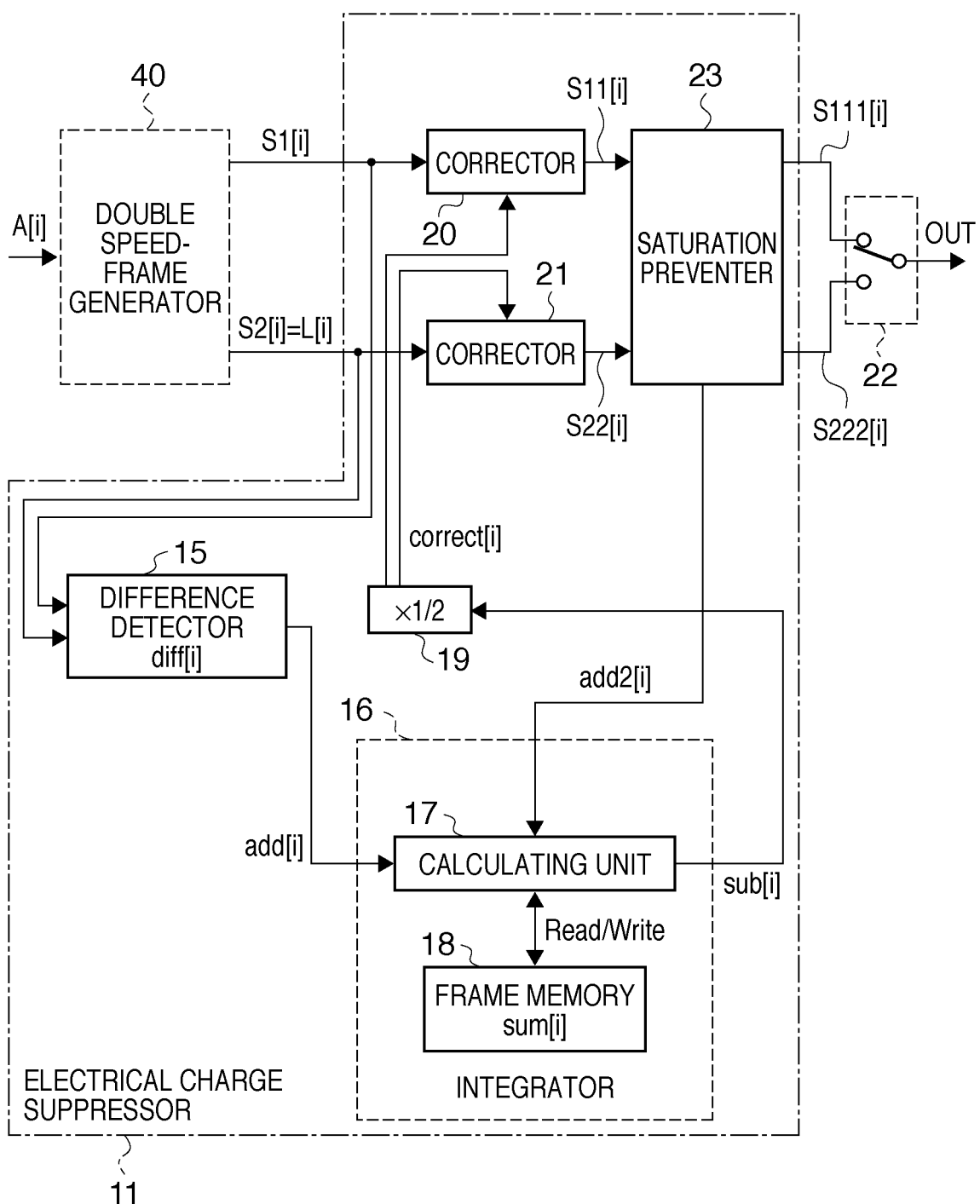
FIG. 15 is a block diagram showing the arrangement of an image processing apparatus according to the fourth embodiment.

FIG. 15 is a block diagram showing the arrangement of an image processing apparatus which implements the "sub-frame display method based on spatial frequency separation" according to the fourth embodiment. The arrangement shown in FIG. 15 is the same as those in the above-described embodiments in that correctors 20 and 21 correct a first sub-frame signal S1[i] and second sub-frame signal S2[i] supplied from a double speed-frame generator 40 to suppress accumulation of electrical charges. The arrangement shown in FIG. 15 further comprises a saturation preventer 23 for calculating a remaining correction amount after correction by the correctors 20 and 21. The saturation preventer 23 returns the remaining correction amount to an integrator 16, and the integrator 16 feeds it back to the cumulative value sum[i].

Generally in the "sub-frame display method based on spatial frequency separation", the calculated luminance level of a sub-frame (first sub-frame), to which the high frequency component H is concentrated, sometimes exceeds the maximum value (100% level). In this case, the excess over the maximum value is moved to the other sub-frame (second sub-frame). Also, the calculated luminance level of the first sub-frame sometimes becomes lower than 0 level. In this case, a luminance component corresponding to the shortage is moved from the second sub-frame. The saturation preventer 23 controls this moving processing. The range of the maximum value to 0 level is the allowable range of the pixel level.

S1[i] and S2[i] represent outputs from the double speed-frame generator 40, S11[i] represents an output from the corrector 20, S22[i] represents an output from the corrector 21, and S111[i] and S222[i] represent outputs from the saturation preventer 23.

Similar to the first embodiment, correction processing by the correctors 20 and 21 is given by $$S11[i]=S1[i]-\text{correct}[i] \quad (5\text{-}1\text{-}1)$$

$$S22[i]=S2[i]+\text{correct}[i] \quad (5\text{-}1\text{-}2)$$

Saturation processing by the saturation preventer 23 in the fourth embodiment is given as a function Sat( ) in equations (5-2-1) and (5-2-2):

$$S111[i]=\text{Sat}1(S11[i],S22[i]) \quad (5\text{-}2\text{-}1)$$

$$S222[i]=\text{Sat}2(S11[i],S22[i]) \quad (5\text{-}2\text{-}2)$$

Letting correct_rest[i] be an amount by which correction cannot be complete as a result of saturation processing by the saturation preventer 23 for the correction amount correct[i] of the correctors 20 and 21, the remaining correction amount is given by $$\text{correct\_rest}[i]= \{(S111[i]-S222[i])-(S11[i]-S22[i])\}/2 \quad (5\text{-}3)$$

correct_rest[i] corresponds to the difference between an amount of electrical charge accumulation (cumulative value sum[i]) virtually calculated in an electrical charge suppressor 11, and an amount of electrical charge accumulation actually generated in the device. Hence, correct_rest[i] needs to be converted into an amount of electrical charge, and fed back as the remaining correction amount. The amount of electrical charge to be fed back is a feedback value add2[i]:

$$\text{add}2[i]=2\times\text{correct\_rest}[i] \quad (5\text{-}4)$$

The feedback value add2[i] is defined in this fashion. The correction amount is controlled using recurrence formula (5-5) in the fourth embodiment instead of recurrence formula (2-9) in the first embodiment:

$$\text{sum}[i+1]-\text{sum}[i]=\text{add}[i]+\text{add2}[i]-\alpha\times\text{sum}[i] \quad (5\text{-}5)$$

According to the fourth embodiment, when the pixel level of a sub-frame exceeds the allowable range in the saturation preventer 23, it is corrected to fall within the allowable range. That is, the saturation preventer 23 executes correction given by the following equations so as to subtract or add, from or to the signals S11[i] and S22[i], a real correction amount real_correct[i] calculated in consideration of the influence of saturation prevention processing:

$$S111[i]=S11[i]-\text{real\_correct}[i] \quad (5\text{-}6\text{-}1)$$

$$S222[i]=S22[i]+\text{real\_correct}[i] \quad (5\text{-}6\text{-}2)$$

As described above, according to the fourth embodiment, the saturation preventer 23 corrects the pixel level of a sub-frame to fall within the allowable range. This can greatly reduce the difference between an electrical charge accumulation amount virtually reproduced in the frame memory 18, and an electrical charge accumulation amount actually accumulated in the device. Compared to the first embodiment, the fourth embodiment can display a higher-quality moving picture on the liquid crystal panel.

Fifth Embodiment

The fifth embodiment according to the present invention will be described. In the above-described embodiments, the electrical charge suppressor 11 is configured on the assumption that electrical charges are accumulated in proportion to the level difference between the first and second sub-frames. The level difference can be regarded as the level difference between display luminances or that between image data. However, accumulation of electrical charges is not accurately proportional to the level difference between image data or that between display luminances, and has a nonlinear relationship with them. The fifth embodiment monitors and corrects the first and second sub-frames in consideration of the nonlinear relationship.

Figure 16:
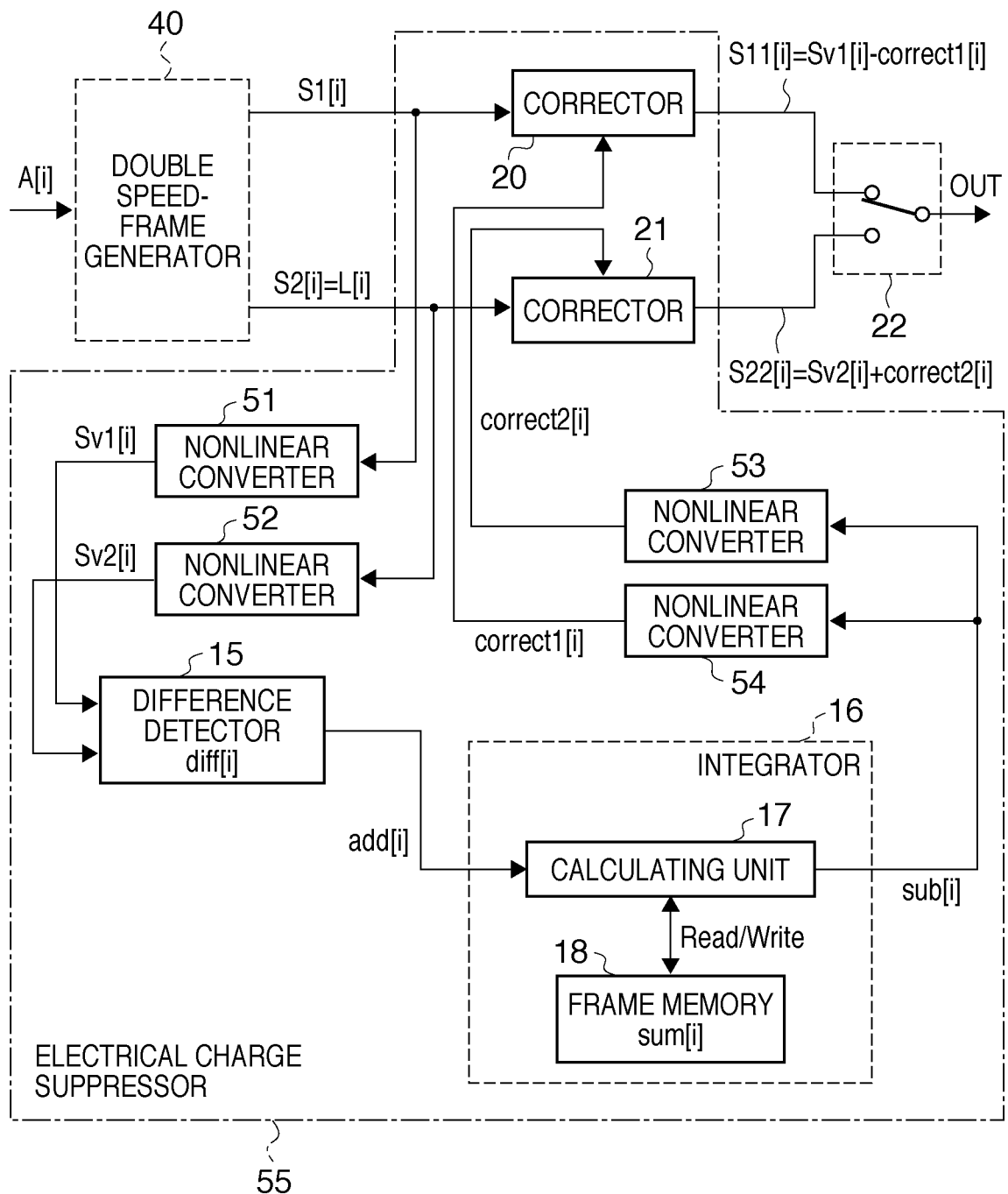
FIG. 16 is a block diagram showing the arrangement of an image processing apparatus according to the fifth embodiment.

FIG. 16 is a block diagram showing an arrangement for implementing the "sub-frame display method based on spatial frequency separation" according to the fifth embodiment. Similar to the electrical charge suppressor 11 in the above-described embodiments, an electrical charge suppressor 55 in the fifth embodiment monitors and corrects the first and second sub-frame signals.

In the electrical charge suppressor 55, nonlinear converters 51 and 52 generate signals Sv1[i] and Sv2[i] by performing predetermined nonlinear conversion for first and second sub-frame signals S1[i] and S2[i], and send the signals Sv1[i] and Sv2[i] to a difference detector 15. The nonlinear conversion by the nonlinear converters 51 and 52 is the first conversion, and the first conversion converts a signal value into an amount of electrical charge accumulation. A subtraction signal sub[i] calculated by an integrator 16 is not simply halved, unlike the first embodiment, but undergoes predetermined nonlinear conversion by nonlinear converters 53 and 54. The nonlinear conversion by the nonlinear converters 53 and 54 is the second conversion. The second conversion is inverse conversion corresponding to the first conversion, and converts an amount of electrical charge accumulation into a signal value. As a result, the nonlinear converters 53 and 54 calculate correction amounts correct1[i] and correct2[i] for respective sub-frames. Based on correct1[i] and correct2[i], correctors 20 and 21 correct the first and second sub-frames. The nonlinear converters 51 to 54 suffice to be formed from lookup tables representing the relationship between signal values and amounts of electrical charge accumulation.

As described above, the fifth embodiment calculates the correction values of the first and second sub-frame signals by executing nonlinear conversion for the first and second sub-frame signals in consideration of the nonlinear relationship representing the signal value and the electrical charge amount. The fifth embodiment can achieve more accurate electrical charge accumulation control.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-207182, filed Aug. 8, 2007, which is hereby incorporated by reference herein in its entirety.

What is claimed is:

1. An image processing apparatus for generating image data to be supplied to an image display apparatus which inverts a drive polarity of display elements in each sub-frame of plural sub-frames formed from a frame of a moving picture to display the moving picture, the image processing apparatus comprising:

a generator configured to generate a first sub-frame and a second sub-frame from a frame of interest of a moving picture;

a detector configured to detect a difference between a picture of the first sub-frame and a picture of the second sub-frame;

an accumulator configured to accumulate the difference as a cumulative value;

a calculator configured to calculate a correction value of a picture of the first sub-frame and a picture of the second sub-frame based on the cumulative value; and a corrector, configured to employ the correction value so as to correct the picture of the first sub-frame and the picture of the second sub-frame, and to subtract a first value based on the correction value from the cumulative value, wherein the corrector is operable to add a second value of approximately half the correction value to one of the picture of the first sub-frame and the picture of the second sub-frame, and to subtract the second value from the other one of the picture of the first sub-frame and the picture of the second sub-frame so as to decrease a difference between an absolute value of the picture of the first sub-frame and an absolute value of the picture of the second-frame.

2. The apparatus according to claim 1, wherein the calculator is operable to subtract from the difference the cumulative value multiplied by a coefficient larger than 0 and smaller than 1 to calculate the correction value.

3. The apparatus according to claim 1, wherein the generator is operable to separate a picture of the frame of interest into a high frequency component and low frequency component of a spatial frequency, and to generate the first sub-frame from the high frequency component and the low frequency component, and to generate the second sub-frame from the low frequency component.

4. The apparatus according to claim 1, wherein the generator is operable to separate both a picture of the frame of interest and a picture of a frame adjacent to the frame of interest into respective high frequency components and low frequency components of spatial frequencies, and to generate the first sub-frame from the high frequency component and low frequency component of the frame of interest, and to generate the second sub-frame by averaging the low frequency component of the frame of interest and the low frequency component of the adjacent frame.

5. The apparatus according to claim 1, wherein the generator is operable to generate the second sub-frame based on motion compensation.

6. The apparatus according to claim 1, further comprising:

a first converter configured to perform predetermined nonlinear conversion for the picture of the first sub-frame and for the picture of the second sub-frame, and to supply the converted pictures to the detector; and a second converter configured to perform inverse conversion corresponding to the predetermined nonlinear conversion for the correction value calculated by the calculator, and to supply the inversely converted correction value to the corrector.

7. An image processing apparatus for generating image data to be supplied to an image display apparatus which inverts a drive polarity of display elements in each sub-frame of plural sub-frames formed from a frame of a moving picture to display the moving picture, the image processing apparatus comprising:

a generator configured to generate a first sub-frame and a second sub-frame from a frame of interest of a moving picture;

a detector configured to detect a difference between a picture of the first sub-frame and a picture of the second sub-frame;

an accumulator configured to accumulate the difference as a cumulative value;

a calculator configured to calculate a correction value of a picture of the first sub-frame and a picture of the second sub-frame based on the cumulative value;

a corrector configured to employ the correction value so as to correct the picture of the first sub-frame and the picture of the second sub-frame, and to subtract a value based on the correction value from the cumulative value; and a saturation preventer configured to prevent deviation, from an allowable range, of a pixel value of the picture of the first sub-frame and a pixel value of the picture of the second sub-frame that are corrected by the corrector;

wherein the accumulator is operable to add, to the cumulative value, the correction value and a difference between correction results upon the prevention.

8. An image processing method of generating image data to be supplied to an image display apparatus which inverts a drive polarity of display elements in each sub-frame of plural sub-frames formed from a frame of a moving picture to display the moving picture, the method comprising the steps of:

generating a first sub-frame and a second sub-frame from a frame of interest of a moving picture;

detecting a difference between a picture of the first sub-frame and a picture of the second sub-frame;

accumulating the difference as a cumulative value;

calculating a correction value of a picture of the first sub-frame and a picture of the second-frame based on the cumulative value;

employing the correction value to correct the picture of the first sub-frame and the picture of the second sub-frame; and subtracting a first value based on the correction value from the cumulative value, wherein, in the correcting step, a second value of approximately half the correction value is added to one of the picture of the first sub-frame and the picture of the second sub-frame, and the second value is subtracted from the other one of the picture of the first sub-frame and the picture of the second sub-frame so as to decrease a difference between an absolute value of the picture of the first sub-frame and an absolute value of the picture of the second-frame.

9. A non-transitory computer-readable medium storing a computer-executable program for causing a computer to perform an image processing method, the method comprising the steps of:

generating a first sub-frame and a second sub-frame from a frame of interest of a moving picture;

detecting a difference between a picture of the first sub-frame and a picture of the second sub-frame;

accumulating the difference as a cumulative value;

calculating a correction value of a picture of the first sub-frame and a picture of the second sub-frame based on the cumulative value;

employing the correction value to correct the picture of the first sub-frame and the picture of the second sub-frame; and subtracting a first value based on the correction value from the cumulative value, wherein, in the correcting step, a second value of approximately half the correction value is added to one of the picture of the first sub-frame and the picture of the second sub-frame, and the second value is subtracted from the other one of the picture of the first sub-frame and the picture of the second sub-frame so as to decrease a difference between an absolute value of the picture of the first sub-frame and an absolute value of the picture of the second-frame.

10. An image processing method of generating image data to be supplied to an image display apparatus which inverts a drive polarity of display elements in each sub-frame of plural sub-frames formed from a frame of a moving picture to display the moving picture, the method comprising the steps of:
   generating a first sub-frame and a second sub-frame from a frame of interest of a moving picture;
   detecting a difference between a picture of the first sub-frame and a picture of the second sub-frame;
   accumulating the difference as a cumulative value;
   calculating a correction value of a picture of the first sub-frame and a picture of the second sub-frame based on the cumulative value;
   employing the correction value so as to correct the picture of the first sub-frame and the picture of the second sub-frame;
   subtracting a value based on the correction value from the cumulative value; and
   preventing deviation, from an allowable range, of a pixel value of the picture of the first sub-frame and a pixel value of the picture of the second sub-frame that are corrected in the correcting step,
   wherein, in the accumulating step, the correction value and a difference between correction results upon the prevention are added to the cumulative value.

11. A non-transitory computer-readable medium storing a computer-executable program for causing a computer to perform an image processing method, the method comprising the steps of:
   generating a first sub-frame and a second sub-frame from a frame of interest of a moving picture;
   detecting a difference between a picture of the first sub-frame and a picture of the second sub-frame;
   accumulating the difference as a cumulative value;
   calculating a correction value of a picture of the first sub-frame and a picture of the second sub-frame based on the cumulative value;
   employing the correction value so as to correct the picture of the first sub-frame and the picture of the second sub-frame;
   subtracting a value based on the correction value from the cumulative value; and
   preventing deviation, from an allowable range, of a pixel value of the picture of the first sub-frame and a pixel value of the picture of the second sub-frame that are corrected in the correcting step,
   wherein, in the accumulating step, the correction value and a difference between correction results upon the prevention are added to the cumulative value.

* * * * *